(12) United States Patent
Yan et al.

(10) Patent No.: US 11,757,120 B2
(45) Date of Patent: Sep. 12, 2023

(54) ELECTROCHEMICAL DEVICES AND FUEL CELL SYSTEMS

(71) Applicant: University of Delaware, Newark, DE (US)

(72) Inventors: Yushan Yan, Newark, DE (US); Brian Setzler, Newark, DE (US)

(73) Assignee: University of Delaware, Newark, DE (US)

( * ) Notice: Subject to any disclaimer, the term of this patent is extended or adjusted under 35 U.S.C. 154(b) by 332 days.

(21) Appl. No.: 17/073,696

(22) Filed: Oct. 19, 2020

(65) Prior Publication Data
US 2021/0036350 A1 Feb. 4, 2021

Related U.S. Application Data

(62) Division of application No. 16/278,505, filed on Feb. 18, 2019, now Pat. No. 10,811,711.
(Continued)

(51) Int. Cl.
| | |
|---|---|
| *H01M 8/0612* | (2016.01) |
| *H01M 8/0656* | (2016.01) |
| *H01M 8/0662* | (2016.01) |
| *H01M 4/92* | (2006.01) |
| *H01M 8/1018* | (2016.01) |

(Continued)

(52) U.S. Cl.
CPC ........ *H01M 8/0618* (2013.01); *B01D 53/326* (2013.01); *H01M 4/9041* (2013.01); *H01M 4/926* (2013.01); *H01M 8/0258* (2013.01); *H01M 8/0656* (2013.01); *H01M 8/0681* (2013.01); *H01M 8/1018* (2013.01);
(Continued)

(58) Field of Classification Search
None
See application file for complete search history.

(56) References Cited

U.S. PATENT DOCUMENTS

| | | | | |
|---|---|---|---|---|
| 4,107,395 | A | * | 8/1978 | van Ommering ... H01M 10/345 429/421 |
| 5,219,673 | A | | 6/1993 | Kaun |

(Continued)

FOREIGN PATENT DOCUMENTS

| | | |
|---|---|---|
| EP | 2727882 A1 | 7/2014 |
| EP | 2740710 A1 | 11/2014 |

(Continued)

OTHER PUBLICATIONS

Ghezel-Ayagh, H. et al., "Carbonate Fuel Cell Application for Synergistic Power Generation and Carbon Dioxide Capture," ECS Transactions, 2010, pp. 391-398, vol. 26, No. 1.
(Continued)

*Primary Examiner* — Jason M Greene
(74) *Attorney, Agent, or Firm* — Lewis Rice LLC

(57) ABSTRACT

Electrochemical devices including electrochemical pumps (ECPs) and fuel cell systems comprising a fuel cell and an ECP are disclosed. In particular, this electrochemical device can be an ECP that comprises an anode, a cathode and an anion exchange polymer separating the anode from the cathode. The ECP can be coupled to a hydroxide exchange membrane fuel cell (HEMFC) that is disclosed herein as a fuel cell system. These devices can be used in methods for removing carbon dioxide from air and for generating electricity.

20 Claims, 17 Drawing Sheets

Related U.S. Application Data

(60) Provisional application No. 62/769,764, filed on Nov. 20, 2018.

(51) Int. Cl.
*H01M 8/0258* (2016.01)
*H01M 4/90* (2006.01)
*B01D 53/32* (2006.01)
*H01M 8/10* (2016.01)

(52) U.S. Cl.
CPC ............. *B01D 2257/504* (2013.01); *H01M 2008/1095* (2013.01); *H01M 2300/0082* (2013.01)

(56) References Cited

U.S. PATENT DOCUMENTS

| | | | |
|---|---|---|---|
| 9,368,819 B1 | 6/2016 | Gottesfeld | |
| 9,370,773 B2 | 6/2016 | Masel et al. | |
| 10,173,178 B1 | 1/2019 | Despande et al. | |
| 2001/0041281 A1 | 11/2001 | Wilkinson et al. | |
| 2006/0046135 A1* | 3/2006 | Huang | H01M 4/50 429/224 |
| 2009/0159456 A1* | 6/2009 | Littau | B01D 53/326 205/555 |
| 2010/0205856 A1 | 8/2010 | Kubic et al. | |
| 2010/0230293 A1* | 9/2010 | Gilliam | B01D 53/326 205/555 |
| 2011/0027664 A1* | 2/2011 | Burchardt | H01M 4/8605 429/403 |
| 2011/0195323 A1 | 8/2011 | Inoue et al. | |
| 2012/0193222 A1 | 8/2012 | Mustain, Jr. et al. | |
| 2013/0052549 A1 | 2/2013 | Mizuhata et al. | |
| 2013/0122382 A1* | 5/2013 | Mizuhata | B01D 53/326 205/765 |
| 2015/0182917 A1 | 7/2015 | Hosoya et al. | |
| 2017/0314142 A1 | 11/2017 | Leonard et al. | |
| 2018/0111083 A1 | 4/2018 | Masel | |
| 2018/0248198 A1 | 8/2018 | Yadav | |
| 2018/0326364 A1 | 11/2018 | Kim et al. | |
| 2019/0051907 A1* | 2/2019 | Cui | H01M 4/9041 |

FOREIGN PATENT DOCUMENTS

| | | | |
|---|---|---|---|
| WO | 2017/172824 A1 | 10/2017 | |
| WO | WO 2017172824 A1 * | 10/2017 | ............. B01D 71/82 |
| WO | WO2017172824 A1 | 10/2017 | |

OTHER PUBLICATIONS

Ghezel-Ayagh, H. et al., "Energy Sustainability through Combined Electric Power Production and Carbon-Dioxide Separation (CEPACS) Systems," ECS Transactions, 2012, pp. 23-29, vol. 42, No. 1.
Landon, J. et al., "Electrochemical Concentration of Carbon Dioxide from an Oxygen/Carbon Dioxide Containing Gas Stream," Journal of the Electrochemical Society, 2010, pp. B1149-B1153, vol. 157, No. 8.
Li, K. et al., "Removal of Carbon Dioxide from Breathing Gas Mixtures Using an Electrochemical Membrane Cell," Separation Science and Technology, 1993, pp. 1085-1090, vol. 28, No. 4.
Pennline, H. W. et al., "Separation of CO2 from flue gas using electrochemical cells," Fuel, 2010, pp. 1307-1314, vol. 89.
Rigdon, W. A. et al., "Carbonate Dynamics and Opportunities with Low Temperature, Anion Exchange Membrane-Based Electrochemical Carbon Dioxide Separators," Journal of Electrochemical Energy Conversion and Storage, May 2017, pp. 020701-1-020701-8, vol. 14.
Walke, L. et al., "Recovery of CO2 from flue gas using an electrochemical membrane," Gas Separation & Purification, 1988, pp. 72-76, vol. 2.
Winnick, J., "Electrochemical membrane gas separation," Chemical Engineering Progress, 1990, pp. 41-46, vol. 86.
Winnick, J., "Electrochemical Separation of Gases," Advances in Electrochemical Science and Engineering, 1990, pp. 205-248, vol. 1.
International Search Report and Written Opinion issued for PCT/US2019/062499 dated Feb. 6, 2020, 14 pages.
Ponce-Gonzalez, Julia et al., "High Performance aliphatic-heterocyclic benzyl-quaternary ammonium radiation-grafted anion exchange membranes", Energy & Environmental Science, Jan. 1, 2016, pp. 3724-3735, vol. 9 No. 12.
Zeng, L et al., "A high-performance sandwiched-porous polybenzumidazole membrane with enhanced alkaline retention for anion exchange membrane fuel cells", Energy & Environmental Science, Jan. 1, 2015, pp. 2768-2774, vol. 8 No. 9.
Varcoe, John R et al., "Anion-exchange membranes in electrochemical energy systems", Energy & Environmental Science, Aug. 4, 2014, pp. 3135-3191, vol. 7 No. 10.
Yanagi, H et al., "Anion Exchange Membrane and Ionomer for Alkaline Membrane Fuel Cells (AMFCs)", ECS Transactions, Electrochemical Society, Jan. 1, 2008, pp. 257-262, vol. 16 No. 2.
Danks, Timothy N. et al., "Comparison of PVDF-and FEP-based radiation-grafted alkaline anion-exchange membranes for use in low temperature portable DMFCs", Journal of Materials Chemistry, Sep. 26, 2002, pp. 3371-3373, vol. 12 No. 12.
Luo, Xiaoyan et al., "Structure-transport relationships of poly (aryl-piperidinium) anion-exchange memberanes: Eeffect of anions and Hydration", Journal of Membrane Science Nov. 19, 2019, vol. 588.
Mandal, Mrinmay et al., "Highly Conductive Anion-Exchange Membranes Based on Cross-Linked Poly) norbomene): Vinyl Addition Polymerization", ACS Applied Energy Materials, Mar. 20, 2019, pp. 2447-2457, vol. 2 No. 4.
Fan, Jianto et al., "Poly (bis-arylimidazoliums) possessing high hydroxide ion exchange capacity and high alkaline stability", Nature Communications, May 24, 2019, vol. 10 No. 1.
Wang, Teng, et al., "High-Performance Hydroxide Exchange Membrane Fuel Cells through Optimization of Relative Humidity, Backpressure and Catalyst Selection", Journal of the Electrochemical Society Jan. 1, 2019, vol. 166, No. 7.
Wang, Junhua et al., "Poly (aryl piperidinium) membranes and ionomers for hydroxide exchange" Nature Energy, Apr. 8, 2019, pp. 392-398, vol. 4, No. 5.
European Search Report and Written Opinion for Application No. 19886702.0, dated Jul. 7, 2022, 36 Pages.
International Search Report and Written Opinion issued for PCT/US2021/33489 dated Aug. 16, 2021, 9 pages.

* cited by examiner

Anode gas flow layer

ELECTROCHEMICAL DEVICES AND FUEL CELL SYSTEMS

CROSS REFERENCE TO RELATED APPLICATIONS

This application is a divisional of U.S. Non-Provisional application Ser. No. 16/278,505 filed on Feb. 18, 2019, which claims the benefit of U.S. Provisional Application No. 62/769,764 filed on Nov. 20, 2018. The entire contents of the above applications are hereby incorporated by reference.

STATEMENT REGARDING FEDERALLY SPONSORED RESEARCH OR DEVELOPMENT

This invention was made with Government support under grants DE-AR0000771 awarded by Advanced Research Projects Agency—Energy (ARPA-E) U.S. Department of Energy. The Government has certain rights in the invention.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

Electrochemical devices, particularly electrochemical pumps (ECPs), and fuel cell systems comprising a hydroxide exchange membrane fuel cell (HEMFC) and an ECP are disclosed. These ECPs and systems can be used in methods for removing carbon dioxide from air and for generating electricity by operation of a fuel cell with $CO_2$-containing air.

BACKGROUND OF THE INVENTION

Carbon dioxide ($CO_2$) is an acid gas present at roughly 400 ppm in atmospheric air. As an acid gas, $CO_2$ reacts with strong bases like hydroxide anions to form carbonate and bicarbonate anions.

 [1]

 [2]

Alkaline fuel cells and hydroxide exchange membrane fuel cells (HEMFCs) use hydroxide-conducting electrolytes and suffer significant efficiency losses when exposed to $CO_2$. Liquid alkaline fuel cells suffer from carbonate precipitation, which clogs pores and can be fatal to the cell. HEMFCs have tethered cations that cannot form carbonate precipitates, but the efficiency of the HEMFC is reduced by concentration gradients of carbonate anions in the cell. When operating at steady state on $CO_2$-containing air, the anode consumes hydroxide and accumulates bicarbonate until the local pH drops sufficiently low that bicarbonate is decomposed. The cell reaches a steady state where $CO_2$ is captured by the cathode at the same rate it is released from the anode, and the pH gradient between anode and cathode typically causes a few hundred mV of loss. The loss is typically 100-300 mV when the cathode gas contains 400 ppm $CO_2$.

HEMFCs have potential cost advantages over the more common proton exchange membrane fuel cells (PEMFCs) due in large part to the improved corrosion resistance of many metals in alkaline electrolyte compared to acid. This enables nonprecious metal catalysts, especially at the cathode, and cheaper bipolar plate materials. However, as explained above, achieving good HEMFC performance and efficiency requires the use of air supply to the cathode that has a low concentration of $CO_2$. Therefore, a compact and low-cost device to generate an air stream having a low $CO_2$ concentration is important for a commercially viable HEMFC technology.

The current state-of-the-art for generating an air stream having a low concentration of carbon dioxide for an HEMFC is to use two or more beds of regenerable polymer amine sorbents as disclosed in U.S. Pat. No. 9,368,819. The beds are thermally regenerated, and a minimum of two beds are required to provide continuous operation, so that one bed is online while the other bed is regenerating. This design is complex and bulky, and may not be suitable for transportation use or other space-constrained HEMFC applications.

Additionally, systems for removing carbon dioxide from a gas stream have many applications outside of the field of HEMFCs. Additional applications include: $CO_2$ removal for metal-air batteries, breathing gas purification for diving, submarine, or space applications; $CO_2$ enrichment of greenhouses to accelerate plant growth; $CO_2$ capture from flue gas or air for subsequent use or sequestration; and separation of gases in industrial applications.

Therefore, a need exists for a more efficient and cost-effective device and method for removing carbon dioxide from carbon dioxide-containing gas that can be used with additional devices (e.g., fuel cells).

BRIEF SUMMARY OF THE INVENTION

The present disclosure is directed to fuel cell systems, electrochemical pumps, and methods of using these to reduce the carbon dioxide concentration in air and to generate electricity.

For example, the disclosure is directed to a fuel cell system comprising a hydroxide exchange membrane fuel cell (HEMFC) and an electrochemical pump (ECP) for separating carbon dioxide from a carbon dioxide-containing gas, the ECP comprising a cell, the cell comprising an anode, a cathode, and a membrane. The anode comprises an anode electrocatalyst for oxidizing a reagent to form protons or consume hydroxide ions; the cathode comprises a cathode electrocatalyst for reducing oxygen to form hydroxide ions; and the membrane is adjacent to and separates the anode and the cathode. The carbon dioxide-containing gas is supplied to the cathode and the carbon dioxide reacts with the hydroxide ions formed at the cathode to form bicarbonate ions, carbonate ions, or bicarbonate and carbonate ions. The bicarbonate ions, carbonate ions, or bicarbonate and carbonate ions are transported to the anode through the membrane; and the bicarbonate ions, carbonate ions, or bicarbonate and carbonate ions react at the anode to form carbon dioxide and water. The carbon dioxide-containing gas is air and after the air passes through the cathode of the ECP to reduce the concentration of the carbon dioxide, the air that has the reduced concentration of carbon dioxide is directed to a cathode inlet of the HEMFC.

Additionally, the disclosure is directed to an internal-current electrochemical pump (iECP) for separating carbon dioxide from a carbon dioxide-containing gas comprising a cell, the cell comprising an anode, a cathode, and a membrane. The anode comprises an anode electrocatalyst for oxidizing a reagent to form protons or consume hydroxide ions. The cathode comprises a cathode electrocatalyst for reducing a reagent to form hydroxide ions. The membrane is adjacent to and separates the anode and the cathode. The carbon dioxide-containing gas is supplied to the cathode and the carbon dioxide reacts with the hydroxide ions formed at the cathode to form bicarbonate ions, carbonate ions, or bicarbonate and carbonate ions. The bicarbonate ions, carbonate ions, or bicarbonate and carbonate ions are transported to the anode through the membrane; and the bicarbonate ions, carbonate ions, or bicarbonate and carbonate ions react at the anode to form carbon dioxide and water. The anode and the cathode are electronically connected through the membrane.

Further, the disclosure is directed to an electrochemical pump (ECP) for separating carbon dioxide from air comprising a cell, the cell comprising an anode, a cathode, and a membrane, and having air supplied to the cathode and hydrogen supplied to the anode. The anode comprises an anode electrocatalyst for oxidizing hydrogen to form protons or consume hydroxide ions. The cathode comprises a cathode electrocatalyst for reducing oxygen in air to form hydroxide ions. The membrane is adjacent to and separates the anode and the cathode. The carbon dioxide in the air supplied to the cathode reacts with the hydroxide ions to form bicarbonate ions, carbonate ions, or bicarbonate and carbonate ions. The bicarbonate ions, carbonate ions, or bicarbonate and carbonate ions are transported to the anode through the membrane; and the bicarbonate ions, carbonate ions, or bicarbonate and carbonate ions react at the anode to form carbon dioxide and water.

Additionally, the disclosure is directed to a method for separating carbon dioxide from a carbon dioxide-containing gas or air comprising supplying the cathode of the electrochemical pump (ECP) of the fuel cell systems described herein with the carbon dioxide-containing gas or air and supplying the anode of the ECP with a hydrogen-containing gas.

This disclosure is also directed to an electrochemical pump (ECP) for separating carbon dioxide from a carbon dioxide-containing gas comprising a cell, the cell comprising a membrane and two electrodes that are capable of acting as an anode or a cathode. The two electrodes each independently comprises a charge-storage compound that reacts to form hydroxide when acting as cathode and reacts to consume hydroxide or produce protons when acting as anode. The membrane is adjacent to and separates the two electrodes. A carbon dioxide-containing gas is contacted with the electrode acting as cathode and the carbon dioxide reacts with the hydroxide ions to form bicarbonate ions, carbonate ions, or bicarbonate and carbonate ions; the bicarbonate ions, carbonate ions, or bicarbonate and carbonate ions are transported to the electrode serving as anode through the membrane; and the bicarbonate ions, carbonate ions, or bicarbonate and carbonate ions react at the electrode acting as anode to form carbon dioxide and water. The ECP also comprises means for reversing the direction of current flow and simultaneously alternating the electrode with which the carbon dioxide-containing gas is contacted, thereby allowing each electrode to act, in turn, as anode and as cathode.

The disclose is further directed to a system comprising a metal-air battery and the electrochemical pumps (ECPs) described herein, wherein the carbon dioxide-containing gas is air and after the air is supplied to the cathode of the ECP to reduce the concentration of the carbon dioxide, the air having the reduced concentration of carbon dioxide is directed to a cathode inlet of the metal-air battery.

Further disclosed is a battery system comprising a metal-air battery and an electrochemical pump (ECP) for separating carbon dioxide from a carbon dioxide-containing gas, the ECP comprising a cell, the cell comprising an anode, a cathode, and a membrane. The anode comprises an anode electrocatalyst for oxidizing a reagent to form protons or consume hydroxide ions. The cathode comprises a cathode electrocatalyst for reducing oxygen to form hydroxide ions. The membrane is adjacent to and separating the anode and the cathode. The carbon dioxide-containing gas is supplied to the cathode and the carbon dioxide reacts with the hydroxide ions formed at the cathode to form bicarbonate ions, carbonate ions, or bicarbonate and carbonate ions. The bicarbonate ions, carbonate ions, or bicarbonate and carbonate ions are transported to the anode through the membrane; and the bicarbonate ions, carbonate ions, or bicarbonate and carbonate ions react at the anode to form carbon dioxide and water. The carbon dioxide-containing gas is air and after the air passes through the cathode of the ECP to reduce the concentration of the carbon dioxide, the air having the reduced concentration of carbon dioxide is directed to a cathode inlet of the metal-air battery.

Other objects and features will be in part apparent and in part pointed out hereinafter.

BRIEF DESCRIPTION OF THE SEVERAL VIEWS OF THE DRAWING

FIG. 15A shows results at a constant current density of 10 mA/cm². FIG. 15B shows results at a constant current density of 20 mA/cm². The anode flow rate is 50 sccm, relative humidity (RH) is 80%, and the outlet pressure is ambient. $CO_2$ concentrations were averaged over the final 30 minutes of a 60 minute hold.

FIG. 16A shows the cathode outlet $CO_2$ concentration as a function of air flow rate. The 5 cm² MEA flowrate (high loading) was scaled to a 25 cm² equivalent for comparison. FIG. 16B shows the calculated average mass transport resistance as a function of outlet $CO_2$ concentration. Results below 1 ppm are excluded due to excessive measurement uncertainty. All measurements were averaged over final 30 min of 60 minute hold.

Corresponding reference characters indicate corresponding parts throughout the drawings.

DETAILED DESCRIPTION OF THE INVENTION

Figure 1:
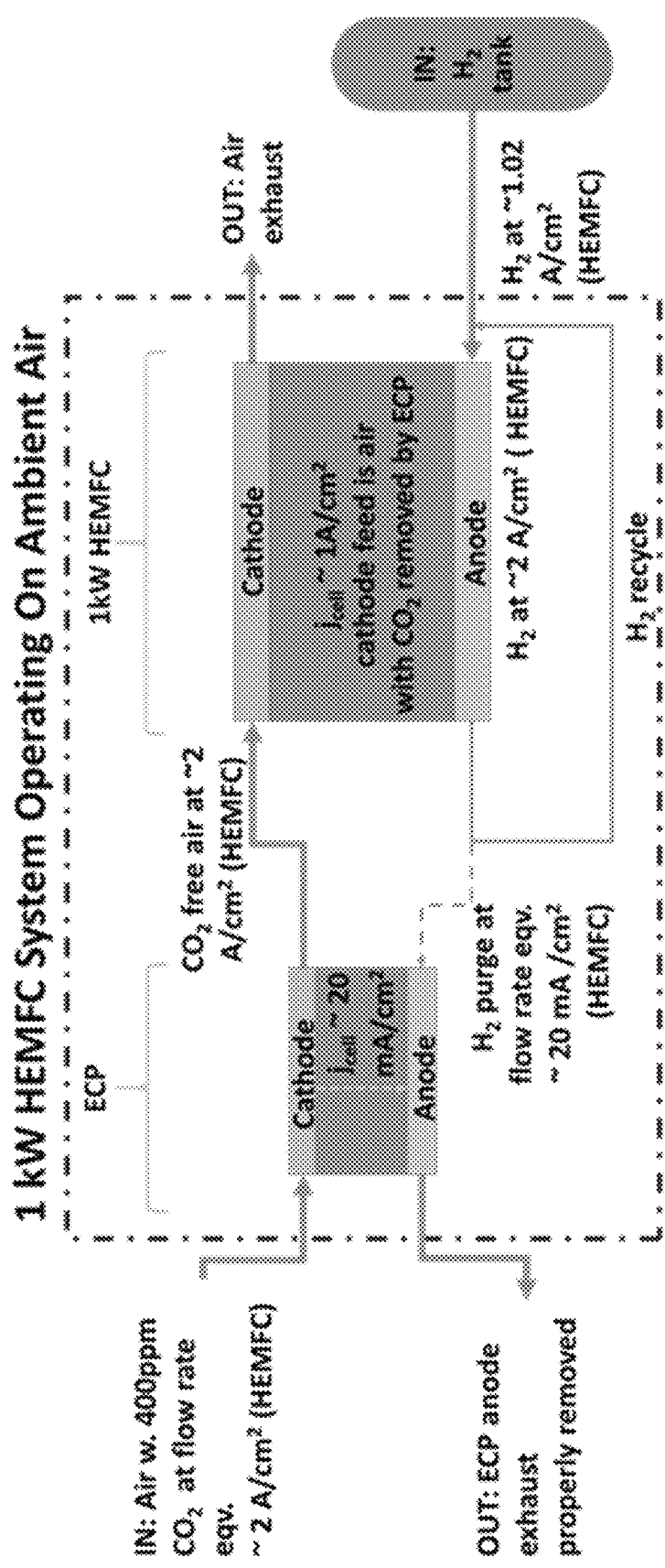
FIG. 1 is a schematic of the fuel cell system comprising a hydroxide exchange membrane fuel cell (HEMFC) and an electrochemical pump (ECP). Air is supplied to the cathode of the ECP where carbon dioxide reacts with electrochemically generated hydroxide. After the air passes through the cathode of the ECP, the concentration of $CO_2$ has been reduced, and the air with reduced $CO_2$ concentration is fed to the cathode inlet of the HEMFC. For illustrative purposes, the system is drawn with hydrogen as the anode reagent in the ECP and with hydrogen being supplied from the purge stream of the HEMFC.

The present disclosure is directed to an electrochemical pump (ECP) for separating carbon dioxide from a carbon dioxide-containing gas. This ECP comprises an anode, a cathode and an anion exchange polymer membrane being adjacent to and separating the anode and the cathode. The ECP can be coupled to a hydroxide exchange membrane fuel cell (HEMFC) to form a system that is disclosed herein as a fuel cell system. A schematic of one example of the fuel cell system is represented in FIG. 1. The fuel cell system can be used in methods to generate electricity.

Figure 2:
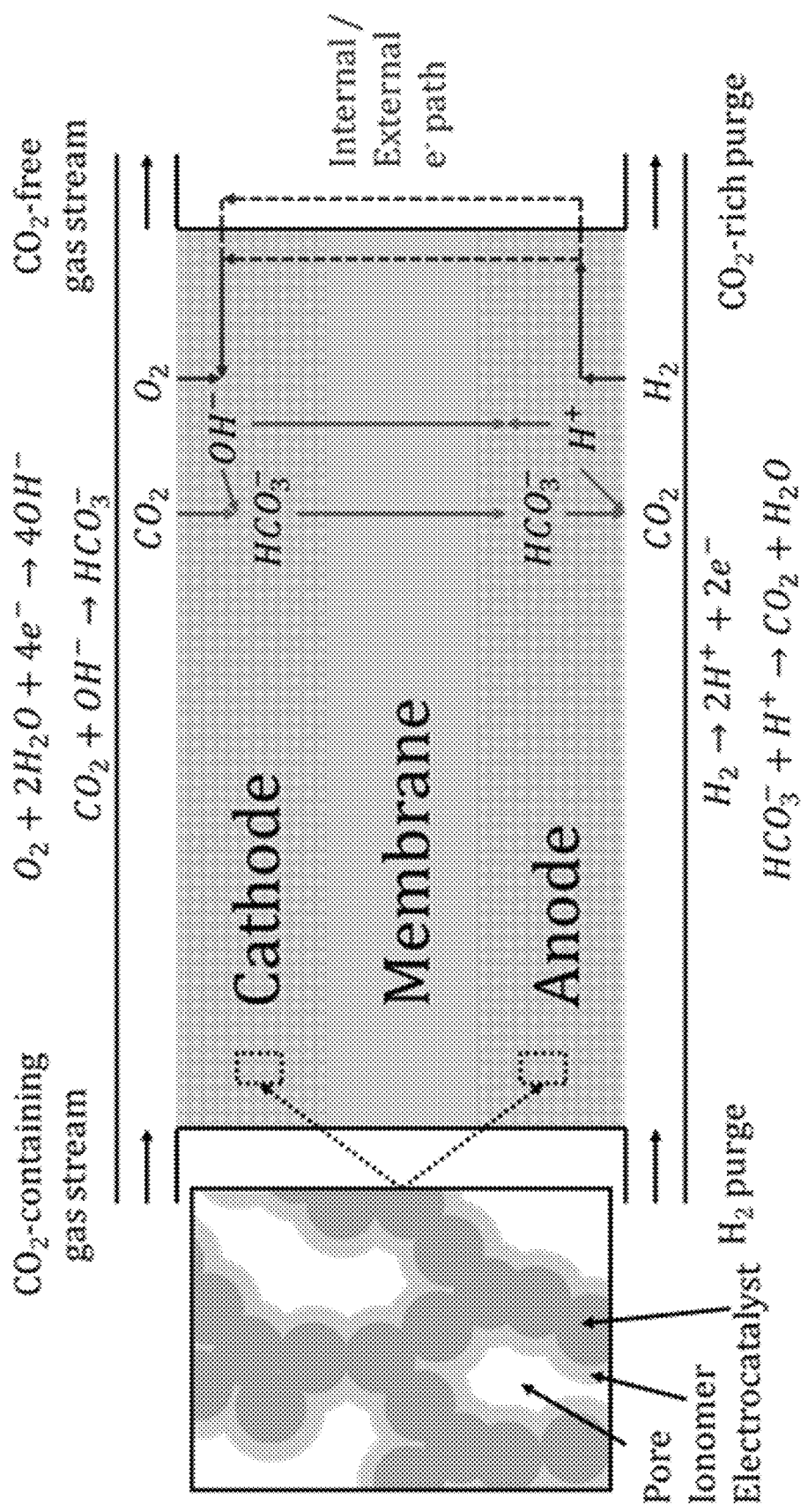
FIG. 2 is a schematic of the ECP operating with oxygen as the cathode reagent and hydrogen as the anode reagent, showing the electrochemical and chemical reactions responsible for CO2 capture and release. The electronic current is shown as taking either an internal path (iECP) or an external path (eECP). The inset shows a stylistic representation of one possible embodiment of the cathode or anode, which comprises an electrocatalyst and an ionomer in a porous structure.

The ECPs described herein can be used to remove $CO_2$ from a gas stream using a membrane electrode assembly (MEA), where hydroxide is generated electrochemically at the cathode, and hydroxide is consumed, or protons generated, electrochemically at the anode. One embodiment of the ECP is illustrated in FIG. 2. $CO_2$ is captured at the cathode by reaction with hydroxide according to Equation 1. Carbonate and bicarbonate anions are driven by the electric field to the anode, where $CO_2$ is released through the overall reaction $$HCO_3^- + H^+ \rightleftharpoons H_2O + CO_2, \qquad [3]$$

that may occur in two steps where proton transfer may occur before or after $CO_2$ release.

Many anode and cathode reactions are possible to generate protons and hydroxide, respectively. Preferred anode reactions include the hydrogen oxidation reaction (HOR), $$H_2 \rightleftharpoons 2H^+ + 2e^-, \text{ or,}$$

$$H_2 + 2OH^- \rightleftharpoons 2H_2O + 2e^- \qquad [4a]$$

ammonia oxidation reaction (AOR), $$2NH_3 \rightleftharpoons N_2 + 6H^+ + 6e^-, \text{ or}$$

$$2NH_3 + 6OH^- \rightleftharpoons N_2 + 3H_2O + 6e^- \qquad [5]$$

oxygen evolution reaction (OER), $$2H_2O \rightleftharpoons O_2 + 4H^+ + 4e^-, \text{ or,}$$

$$4OH^- \rightleftharpoons O_2 + 2H_2O + 4e^- \qquad [6]$$

and nickel hydroxide oxidation reaction (NiOR), $$OH^- + Ni(OH)_2 \rightleftharpoons NiOOH + H_2O + e^-. \qquad [7]$$

Preferred cathode reactions include hydrogen evolution reaction (HER), $$2H_2O + 2e^- \rightleftharpoons H_2 + 2OH^-, \qquad [8]$$

oxygen reduction reaction (ORR), $$O_2 + H_2O + 4e^- \rightleftharpoons 4OH^-, \qquad [9]$$

and nickel oxyhydroxide reduction reaction (NiRR), $$NiOOH + H_2O + e^- \rightleftharpoons Ni(OH)_2 + OH^-. \qquad [10]$$

Using NiOR and NiRR (Equations 7 and 10) or other charge storage electrode reactions, a nearly pure $CO_2$ product stream can be recovered. Continuous operation can be achieved by periodically reversing the cell current and simultaneously switching the gas connections when the electrodes become fully or close to fully charged/discharged.

Also disclosed is a fuel cell system comprising a HEMFC and an ECP for separating carbon dioxide from a carbon dioxide-containing gas comprising a cell, the cell comprising an anode, a cathode, and a membrane. The anode comprises an anode electrocatalyst for oxidizing a reagent to form protons or consume hydroxide ions; the cathode comprises a cathode electrocatalyst for reducing oxygen to form hydroxide ions; and the membrane being adjacent to and separating the anode and the cathode. The carbon dioxide-containing gas is supplied to the cathode of the ECP and the carbon dioxide reacts with the hydroxide ions formed at the cathode to form bicarbonate ions, carbonate ions, or bicarbonate and carbonate ions; the bicarbonate ions, carbonate ions, or bicarbonate and carbonate ions are transported to the anode through the membrane; and the bicarbonate ions, carbonate ions, or bicarbonate and carbonate ions react at the anode to form carbon dioxide and water. The carbon dioxide-containing gas is typically air and after the air is supplied to the cathode of the ECP to reduce the concentration of the carbon dioxide, the air having the reduced concentration of carbon dioxide is directed to a cathode inlet of the HEMFC.

A schematic of the fuel cell system is represented in FIG. 1.

The fuel cell system described herein can have the carbon dioxide-containing gas supplied to the HEMFC cathode contain less than about 20 ppm, 18 ppm, 16 ppm, 15 ppm, 12 ppm, 10 ppm, 8 ppm, 6 ppm, 5 ppm, 4 ppm, 3 ppm, or 2 ppm carbon dioxide with these reduced levels achieved by reaction of $CO_2$ with the hydroxide ions at the cathode of the ECP.

Additionally, the fuel cell system described herein can have the reagent oxidized at the anode electrocatalyst of the ECP be hydrogen and the hydrogen consumed by the ECP for separating carbon dioxide from air is less than about 5%, 4%, 3%, or 2% of the hydrogen consumed by the HEMFC.

For the application of generating $CO_2$-free air for an HEMFC, the best choices of electrode processes in the ECP are HOR (Equation 4) at the anode and ORR (Equation 9) at the cathode, because oxygen is available in the air stream to be purified and hydrogen can be purged from the stack to supply the anode. An additional advantage of these reactions is that they generate enough electromotive force to power the cell, without requiring an external power supply.

The core component of the ECP is the MEA, which comprises a membrane with an electrode on each side. Both electrodes comprise an electrocatalyst and an anion exchange polymer with porosity sufficient to enable gas transport. The electrodes are conductive for both electrons and anions. The membrane comprises an anion exchange polymer and may optionally include reinforcement polymers or electron-conducting additives. If the membrane conducts both electrons and anions, then no external electrical connections are needed, and the MEA can be used in any module configuration, similar to non-electrochemical membranes. An ECP with a membrane that conducts both electrons and anions is referred to herein as an internal-current electrochemical pump (iECP). If the membrane conducts anions only, not electrons, then an external current path must be included in the module. An ECP that requires an external current path is referred to herein as an external-current electrochemical pump (eECP).

The disclosure is also directed to an iECP for separating carbon dioxide from a carbon dioxide-containing gas that has the anode and cathode electronically connected through the anion exchange membrane. When a potential difference appears across this type of cell, both the ionic and electronic currents generated pass through the membrane. This iECP comprises a cell, the cell comprises an anode, a cathode, and a membrane. The anode comprises an anode electrocatalyst for oxidizing a reagent to form protons or consume hydroxide ions; the cathode comprising a cathode electrocatalyst for reducing a reagent to form hydroxide ions; and the membrane being adjacent to and separating the anode and the cathode. The carbon dioxide-containing gas is supplied to the cathode and the carbon dioxide reacts with the hydroxide ions formed at the cathode to form bicarbonate ions, carbonate ions, or bicarbonate and carbonate ions; the bicarbonate ions, carbonate ions, or bicarbonate and carbonate ions are transported to the anode through the membrane; and the bicarbonate ions, carbonate ions, or bicarbonate and carbonate ions react at the anode to form carbon dioxide and water; and the anode and the cathode are electronically connected through the membrane.

A schematic of the ECP having either an internal current path (iECP as described immediately above) or an external current path (eECP) is represented in FIG. 2.

The iECP disclosed herein can have the membrane comprise an anion exchange polymer and an electronically-conductive material or an electronically-conductive anion exchange polymer.

The iECP can have the anion exchange polymer comprise quaternary ammonium or imidazolium groups and a polymer backbone not having ether groups.

Preferably, the iECP described herein can have the anion exchange polymer comprises poly(aryl piperidinium), alkylammonium-functionalized poly(aryl alkylene), substituted-imidazolium-functionalized poly(aryl alkylene), alkylammonium-functionalized poly(styrene), substituted-imidazolium-functionalized poly(styrene), alkylammonium-functionalized poly(styrene-co-divinylbenzene), substituted-imidazolium-functionalized poly(styrene-co-divinylbenzene), alkylammonium-functionalized poly(styrene-block-ethylene-co-butadiene-block-styrene), substituted-imidazolium-functionalized, poly(styrene-block-ethylene-co-butadiene-block-styrene), alkylammonium-functionalized poly(ethylene), substituted-imidazolium-functionalized poly(ethylene), alkylammonium-functionalized poly(tetrafluoroethylene), substituted-imidazolium-functionalized poly(tetrafluoroethylene), alkylammonium-functionalized poly(ethylene-co-tetrafluoroethylene), substituted-imidazolium-functionalized poly(ethylene-co-tetrafluoroethylene), polyethyleneimine, poly(diallyl ammonium), or a combination thereof.

The iECP can have the electronically-conductive material comprise carbon, nickel, stainless steel, silver, an electronically conductive polymer, or a combination thereof. Additionally, the electronically conductive material comprises nanowires or nanotubes.

These electronically-conductive materials that are metals can also be alloys with additional metals.

The iECP can comprise one or more cells that are arranged in a configuration of a hollow fiber.

The hollow fiber would have the cathode on the inside (lumen) and the anode on the outside (shell). The $CO_2$-containing gas would pass through the lumen, and the anode reactant would be fed to the shell side.

A module could be constructed with one or more fibers encased in a cylindrical housing, with the fibers potted in a sealing compound (typically epoxy) forming a bulkhead near each end. The lumen is in fluid communication with the ends of the module beyond the bulkheads, while the shell space is between the two bulkheads and isolated from the ends. The inlet and outlet for the $CO_2$-containing gas are the two ends. The inlet and outlet for anode reactant and separated $CO_2$ are between the two bulkheads. Countercurrent flow would be advantageous, but not strictly required.

Figure 11:
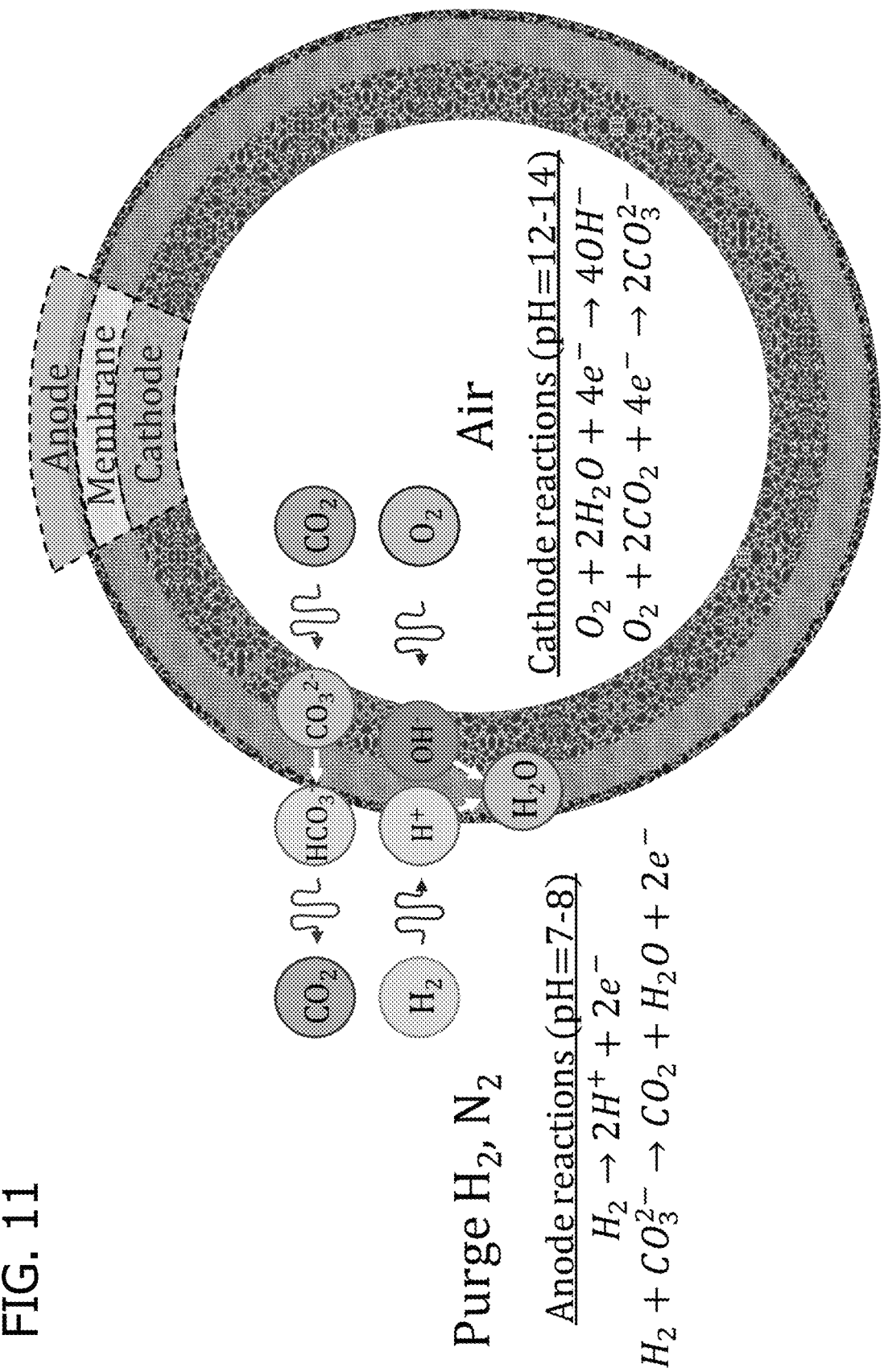
FIG. 11 is schematic of a hollow fiber having an iECP fabricated into the shell.
Figure 12:
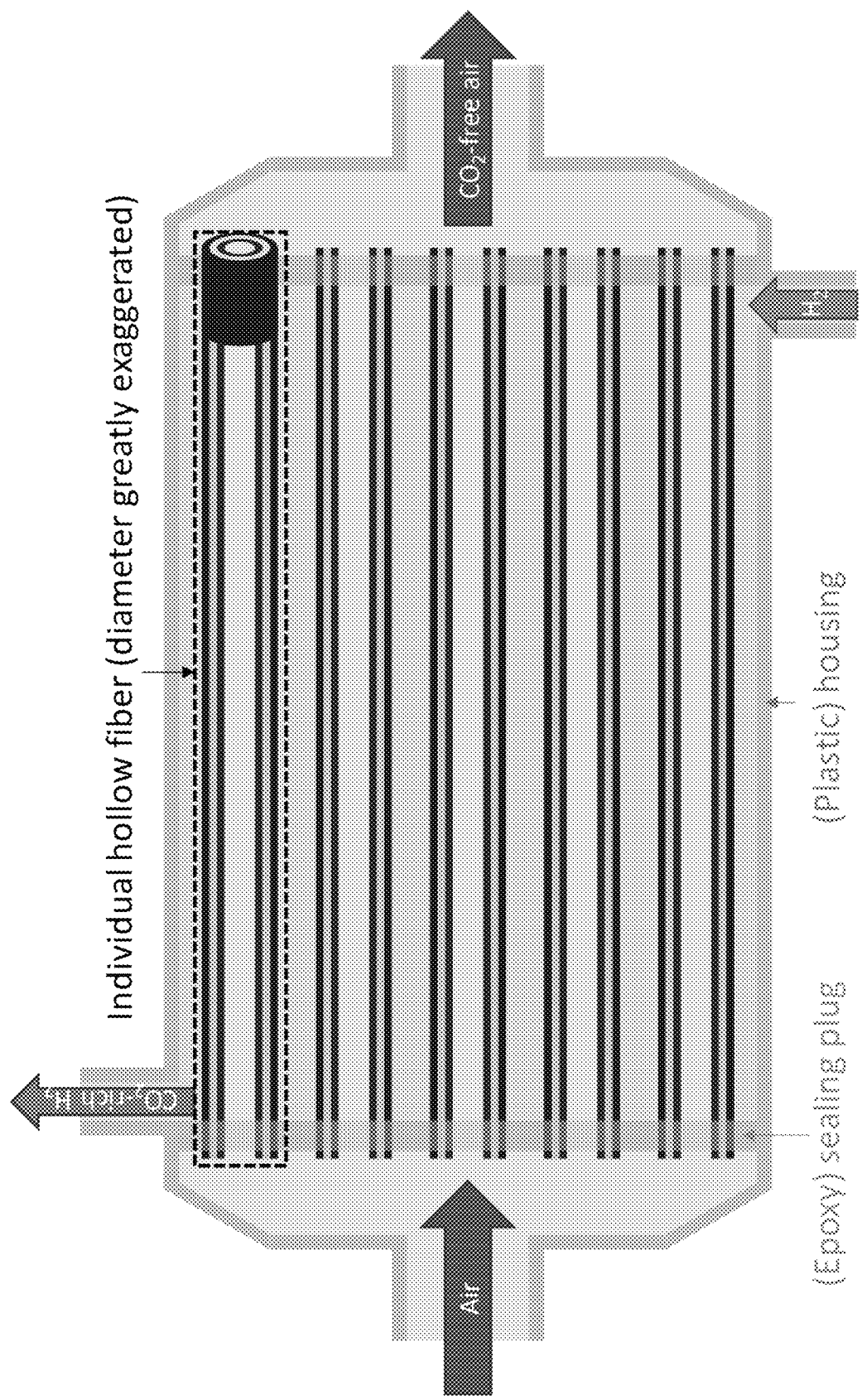
FIG. 12 is a schematic of a module comprising multiple hollow fibers as represented in FIG. 11.

One way this hollow fiber configuration can be arranged is represented in the schematic of FIGS. 11 and 12.

In the hollow-fiber architecture, the lumen of the fiber is the cathode side and the shell of the fiber is the anode side.

The hollow fibers are combined in a bundle and placed in a cylindrical housing with the ends potted in epoxy and cut open. Ports are added to the housing above and below each of the epoxy plugs to give gas access to the lumen and shell side of the fibers. The hollow fiber can be made with several configurations, and as disclosed above, FIGS. 11 and 12 show particular examples that fall within this type of configuration.

The iECP can comprise one or more additional cells and the cells can contain an anode gas flow layer adjacent to one or two anodes, the anode adjacent to the membrane, the membrane adjacent to the anode and the cathode, a cathode gas flow layer adjacent to one or two cathodes, the configuration being represented as follows:

[-AG-A-M-C-CG-C-M-A-]

wherein AG is the anode gas flow layer, A is the anode, M is the membrane, C is the cathode, and CG is the cathode gas flow layer.

More specifically, for the iECP, both planar and spiral-wound architectures are possible, as well as a hollow fiber architecture. There is no requirement to electrically connect individual cells, which expands the possibilities. For the planar and spiral-wound configurations, the cells do not require bipolar plates, but instead can be arranged in a pattern of CMA|AG|AMC|CG|CMA|AG|AMC|CG| . . . , where CMA is an MEA with cathode on the left and anode on the right, AMC is an MEA with anode on the left and cathode on the right, CG is a cathode gas flow layer, and AG is an anode gas flow layer. The spiral-wound module uses one or more leaves of CMA|AG|AMC|CG and wraps them in a spiral pattern so that CG of one wrap or leaf contacts CMA of the next wrap or leaf.

Figure 10:
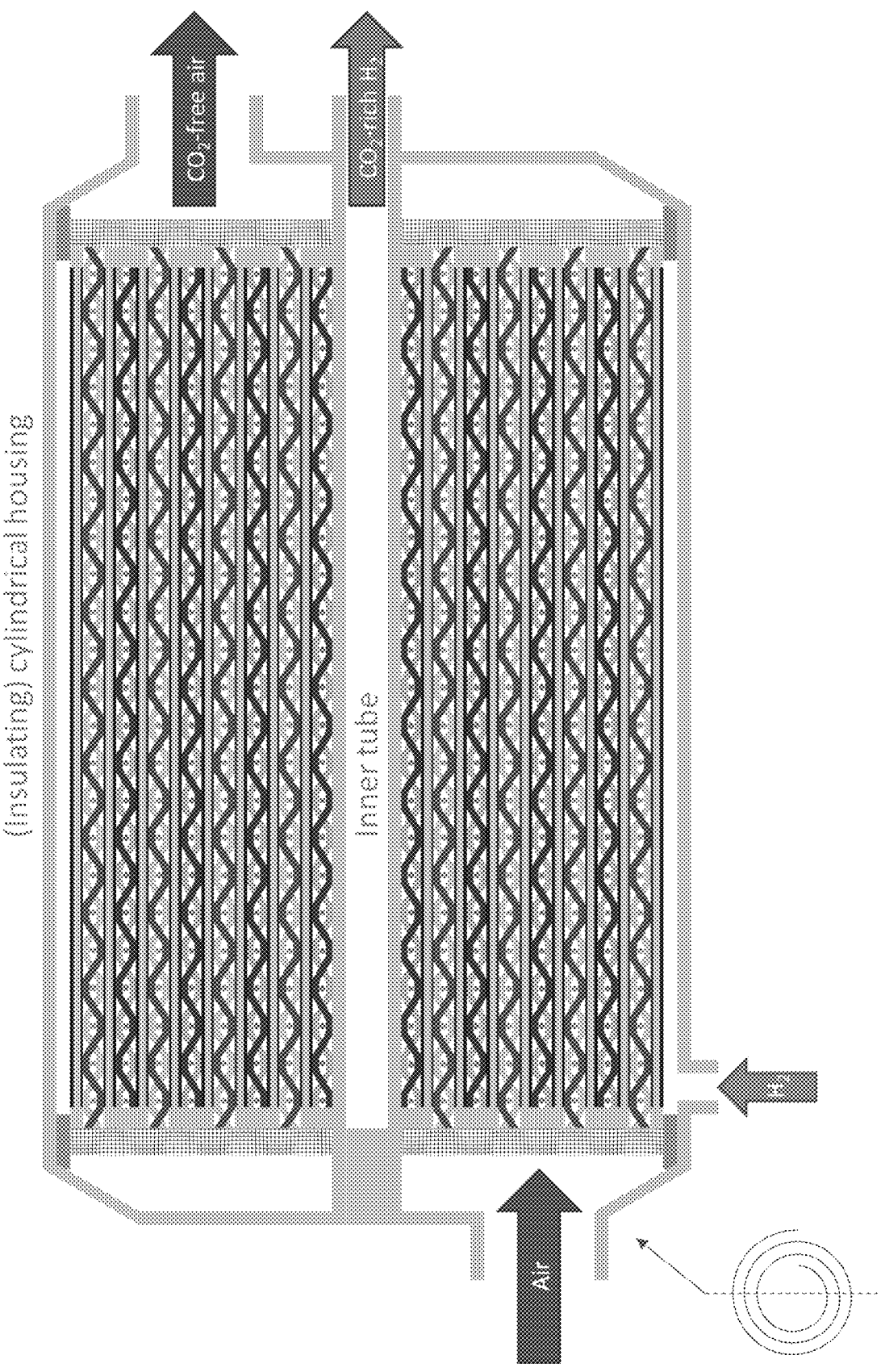
FIG. 10 is a schematic of a spiral wound module having the cell stacks details in FIG. 9.

This configuration provides the advantage that adjacent cells can share a cathode gas flow layer or an anode gas flow layer. This configuration is enabled by iECP design. A schematic of this configuration is represented in FIG. 10.

The iECP described herein can also be incorporated into a fuel cell system comprising a HEMFC. The carbon dioxide-containing gas is air and after the air is passed through the cathode of the iECP to reduce the concentration of carbon dioxide, the air having the reduced concentration of carbon dioxide is directed from the cathode exhaust of the iECP to the cathode inlet of the HEMFC.

Further, the disclosure is directed to an ECP for separating carbon dioxide from air that has hydrogen directed to the anode and air directed to the cathode and uses an anion exchange polymer membrane as electrolyte placed between and adjacent to the anode and the cathode.

The ECP comprises a cell, and the cell comprises an anode, a cathode, and a membrane. The cell has air supplied to the cathode and hydrogen supplied to the anode. The anode comprises an anode electrocatalyst for oxidizing hydrogen to form protons or consume hydroxide ions; the cathode comprises a cathode electrocatalyst for reducing oxygen in air to form hydroxide ions; and the membrane is adjacent to and separates the anode and the cathode. The carbon dioxide in the air supplied to the cathode reacts with the hydroxide ions to form bicarbonate ions, carbonate ions, or bicarbonate and carbonate ions; the bicarbonate ions, carbonate ions, or bicarbonate and carbonate ions are transported to the anode through the membrane; and the bicarbonate ions, carbonate ions, or bicarbonate and carbonate ions react at the anode to form carbon dioxide and water.

Figure 3:
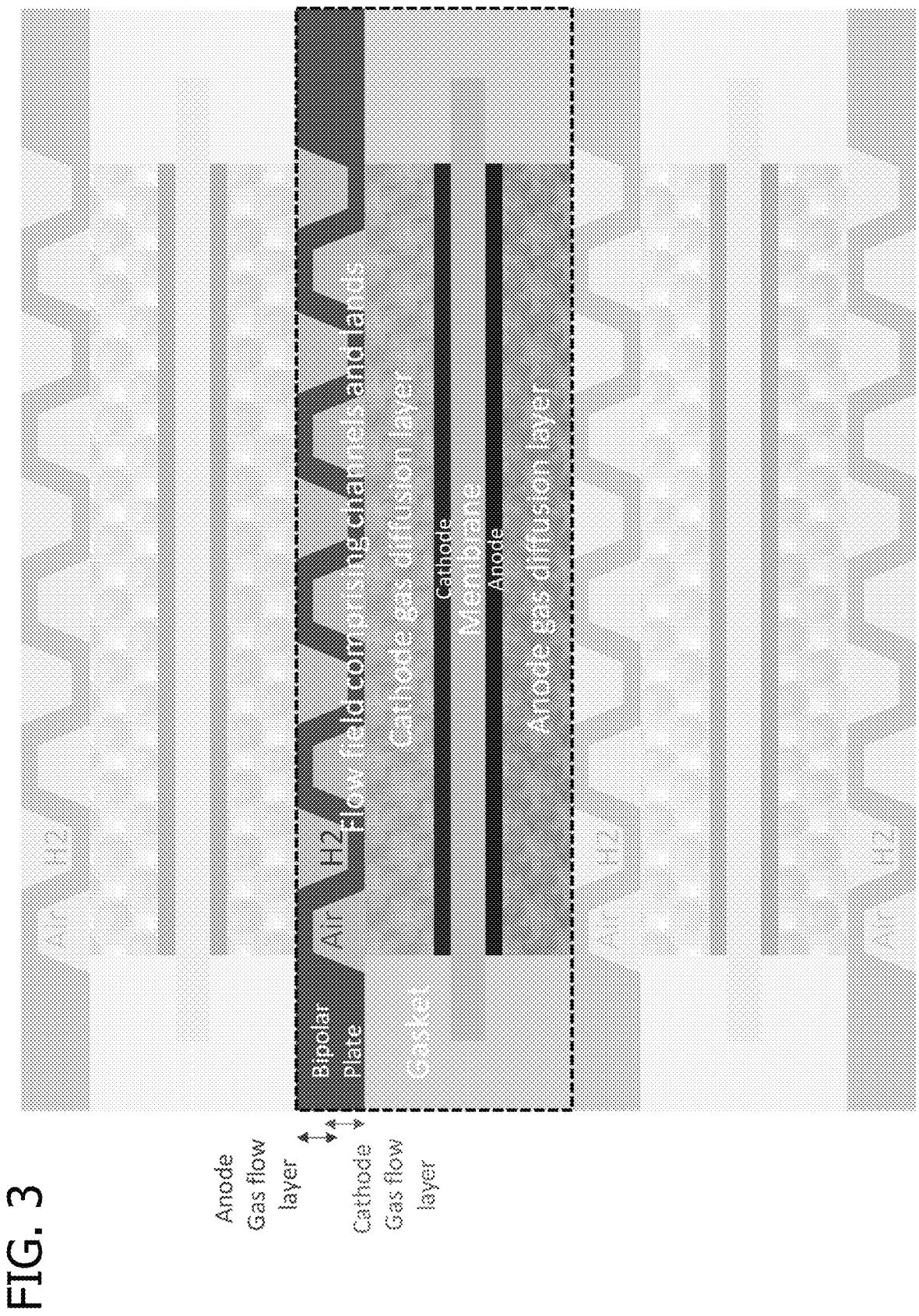
FIG. 3 and FIG. 4 are schematics of different planar hydrogen/air ECP configurations.
Figure 4:
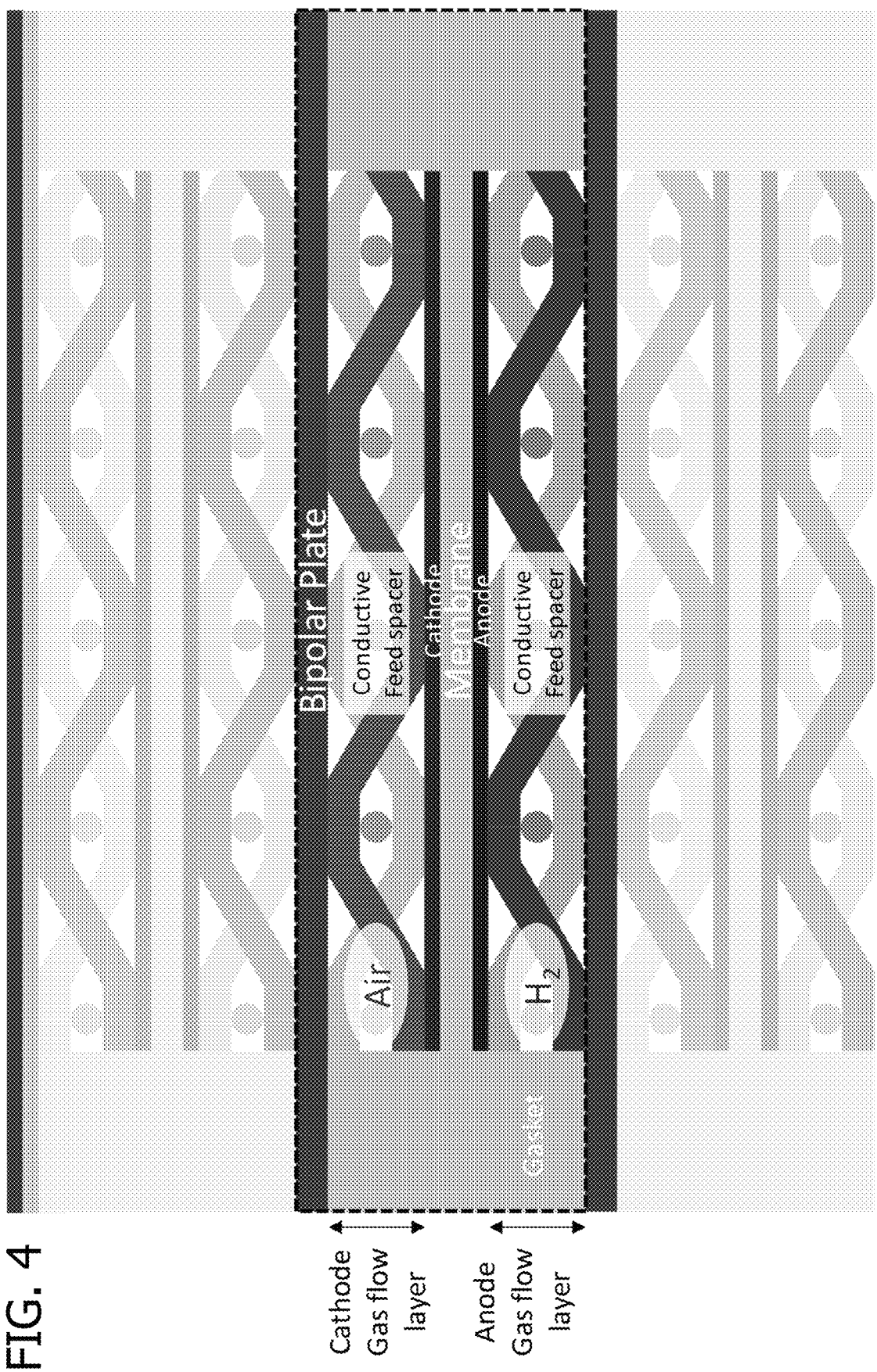

The general schematic of this ECP is represented in FIG. 2. A schematic of some planar hydrogen/air ECP configurations are represented in FIGS. 3 and 4.

The fuel cell system comprising the HEMFC and ECP or the ECP described herein can have the reagent oxidized by the anode electrocatalyst be hydrogen, ammonia, hydrazine, methanol, ethanol, urea, or a combination thereof. Preferably, the reagent oxidized at the anode of the ECP comprises hydrogen or ammonia. More preferably, the reagent oxidized at the anode electrocatalyst comprises hydrogen.

The HEMFC and ECP fuel cell system or the ECP described herein can have the reagent reduced at the cathode electrocatalyst of the ECP comprises oxygen, hydrogen peroxide, or a combination thereof. Preferably, the reagent at the cathode comprises oxygen.

The fuel cell system comprising a HEMFC and ECP or the ECP described herein can have the anode electrocatalyst of the ECP include platinum, a platinum alloy, carbon-supported platinum, a carbon-supported platinum alloy, nickel, a nickel alloy, carbon-supported nickel, a carbon-supported nickel alloy, ruthenium, a ruthenium alloy, carbon-supported ruthenium, a carbon-supported ruthenium alloy, iridium, a iridium alloy, carbon-supported iridium, a carbon-supported iridium alloy, palladium, a palladium alloy, carbon-supported palladium, a carbon-supported palladium alloy, or a combination thereof. Preferably, the anode electrocatalyst comprises a carbon-supported platinum.

The HEMFC and ECP fuel cell system or the ECP described herein can have the cathode electrocatalyst of the ECP include silver, a silver alloy, carbon-supported silver, a carbon-supported silver alloy, platinum, a platinum alloy, carbon-supported platinum, a carbon-supported platinum alloy, palladium, a palladium alloy, carbon-supported palladium, a carbon-supported palladium alloy, manganese oxide, a carbon-supported manganese oxide, cobalt oxide, a carbon-supported cobalt oxide, heteroatom-doped carbon (X—C, where X comprises one or more of N, C, B, P, S, Se, or O), metal-heteroatom-carbon (M-X—C, where X comprises one or more of N, C, B, P, S, Se, or O, and M comprises one or more of Fe, Ce, Cr, Cu, Co, Mo, Ni, Ru, Pd, Pt, Ir, Rh, Os, Ag, Au, Re, Ta, Ti, V, W, Mn, Zn, Sn, Sb, In, Ga, Bi, Pb, or Zr), a perovskite ($ABX_3$ where A comprises one or more of Ca, Sr, Ba, Sc, Y, La, Ce, Zr, Cu, Zn, Sb, Bi, B comprises one or more of Al, Ti, Mn, Fe, Co Ni, W, Pd, and X comprises one or more of O, Se, S), a carbon-supported perovskite ($ABX_3$ where A comprises one or more of Ca, Sr, Ba, Sc, Y, La, Ce, Zr, Cu, Zn, Sb, Bi, B comprises one or more of Al, Ti, Mn, Fe, Co Ni, W, Pd, and X comprises one or more of O, Se, S), or a combination thereof. Preferably, the cathode electrocatalyst comprises silver.

The HEMFC and ECP fuel cell system or the ECP described herein can have the membrane of the ECP comprise an anion exchange polymer.

The anion exchange polymer can comprise poly(arylpiperidinium), alkylammonium-functionalized poly(aryl alkylene), substituted-imidazolium-functionalized poly(aryl alkylene), alkylammonium-functionalized poly(styrene), substituted-imidazolium-functionalized poly(styrene), alkylammonium-functionalized poly(styrene-co-divinylbenzene), substituted-imidazolium-functionalized poly(styrene-co-divinylbenzene), alkylammonium-functionalized poly (styrene-block-ethylene-co-butadiene-block-styrene), substituted-imidazolium-functionalized, poly(styrene-block-ethylene-co-butadiene-block-styrene), alkylammonium-functionalized poly(ethylene), substituted-imidazolium-functionalized poly(ethylene), alkylammonium-functionalized poly(tetrafluoroethylene), substituted-imidazolium-functionalized poly(tetrafluoroethylene), alkylammonium-functionalized poly(ethylene-co-tetrafluoroethylene), substituted-imidazolium-functionalized poly(ethylene-co-tetrafluoroethylene), polyethyleneimine, poly(diallyl ammonium), or a combination thereof. Preferably, the anion exchange polymer comprises poly(arylpiperidinium).

The ECP MEA can be combined with gas flow layers, optional gas diffusion layers, and optional separators to create a cell of the ECP. One or more cells are packaged with gas manifolds, housing, and seals to make an ECP module. The ECP module is combined with a controller to make a complete ECP. Finally, and depending on the application, the ECP can be integrated with an HEMFC stack and other balance-of-system components to make an air-fed ECP-HEMFC system. An example of an air-fed ECP-HEMFC system is shown in FIG. 1.

The eECP as well as an eECP used in the fuel cell system described herein, can have a current be supplied to it by an external power source, or it can have a current drawn by a load if the electromotive force of the electrochemical cell is sufficient to drive the current.

The fuel cell system comprising a HEMFC and ECP or the ECP described herein can have the ECP have one or more additional cells.

The ECP as well as the ECP in the fuel cell system described herein can have one or more additional cells electrically connected in series.

For the eECP, several cell and module configurations are possible. The module architecture can be planar or spiral-wound. Planar modules comprise a stack of planar cells, with manifolds incorporated into the border region outside of the active area to distribute gases to each cell. Cells may be separated by bipolar plates that incorporate flow channels or the cells may be separated by planar bipolar plates with conductive mesh feed spacers used to provide flow pathways. This type of configuration is represented in FIG. 3.

The HEMFC and ECP fuel cell system or the ECP described herein can have the cells be electrically connected in series by an electrically conductive bipolar plate.

The ECP as well as the ECP in the fuel cell system described herein can have each cell further comprise an anode gas flow layer and a cathode gas flow layer.

The ECP as well as the ECP in the fuel cell system described herein can have the anode gas flow layer, the cathode gas flow layer, or the anode gas flow layer and the cathode gas flow layer comprise a flow field of one or more flow channels alternated with a conductive material to provide an electrical connection between the anode, the cathode, or the anode and cathode and the bipolar plate.

A typical bipolar plate is a thin sheet of stainless steel. One side is electrically connected to the anode, and the other side is electrically connected to the cathode of the adjacent cell.

The bipolar plate may be integrated with one or both adjacent gas flow layers. In this case, the bipolar plate is typically stamped to create flow channels on both sides (a corrugated structure).

The ECP as well as the ECP in the fuel cell system described herein can have two or more flow channels of the cathode gas flow layer or two or more flow channels of the anode gas flow layer are arranged in a substantially parallel configuration.

The ECP as well as the ECP in the fuel cell system described herein can have two or more flow channels of the cathode gas flow layer or two or more flow channels of the anode gas flow layer arranged in an interdigitated configuration.

The ECP as well as the ECP in the fuel cell system described herein can have the bipolar plate integrated with an adjacent anode gas flow layer or an adjacent cathode gas flow layer.

The ECP as well as the ECP in the fuel cell system described herein can have the bipolar plate integrated with the adjacent anode gas flow layer and the adjacent cathode gas flow layer.

The ECP as well as the ECP in the fuel cell system described herein can have the anode gas flow layer, the cathode gas flow layer, or the anode gas flow layer, and the cathode gas flow layer comprise an electrically conductive feed spacer.

The fuel cell system comprising a HEMFC and an ECP or the ECP described herein can have the electrically conductive feed spacer made of a mesh made of nickel, a nickel alloy, stainless steel, an electrically-conductive polymer, carbon fiber paper, or a combination thereof.

The ECP as well as the ECP in the fuel cell system described herein can have the electrically conductive feed spacer comprising a perforated metal sheet.

The ECP as well as the ECP in the fuel cell system described herein can have the cells substantially planar and arranged in a stack.

The HEMFC and ECP fuel cell system or the ECP described herein can have the cells be in a stack and formed around an inner tube to form a spiral stack.

The ECP as well as the ECP in the fuel cell system described herein can have each cell comprise a cathode gas flow layer and the cathode gas flow layer in fluid connection with an axial end of a spiral stack.

The ECP as well as the ECP in the fuel cell system described herein can have each cell comprise an anode gas flow layer and the anode gas flow layer is in fluid connection with the inner surface of the tube and the outer radial surface of the spiral stack. The air can enter and leave on the axial ends of the spiral stack as shown in FIGS. 7 and 10.

Figure 5:
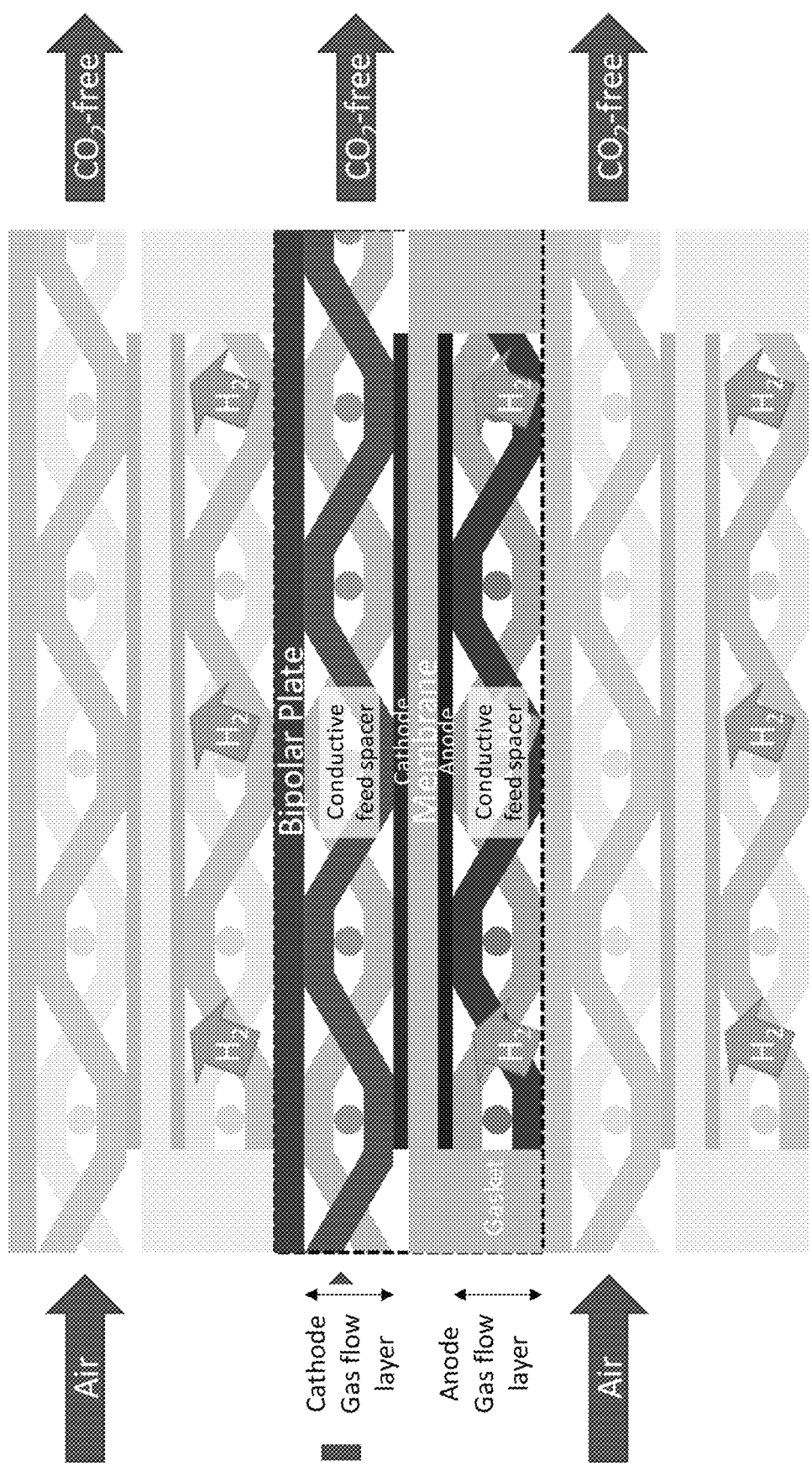
FIG. 5 is a schematic of a spiral wound module showing an example of a possible cell stacking configuration.
Figure 6:
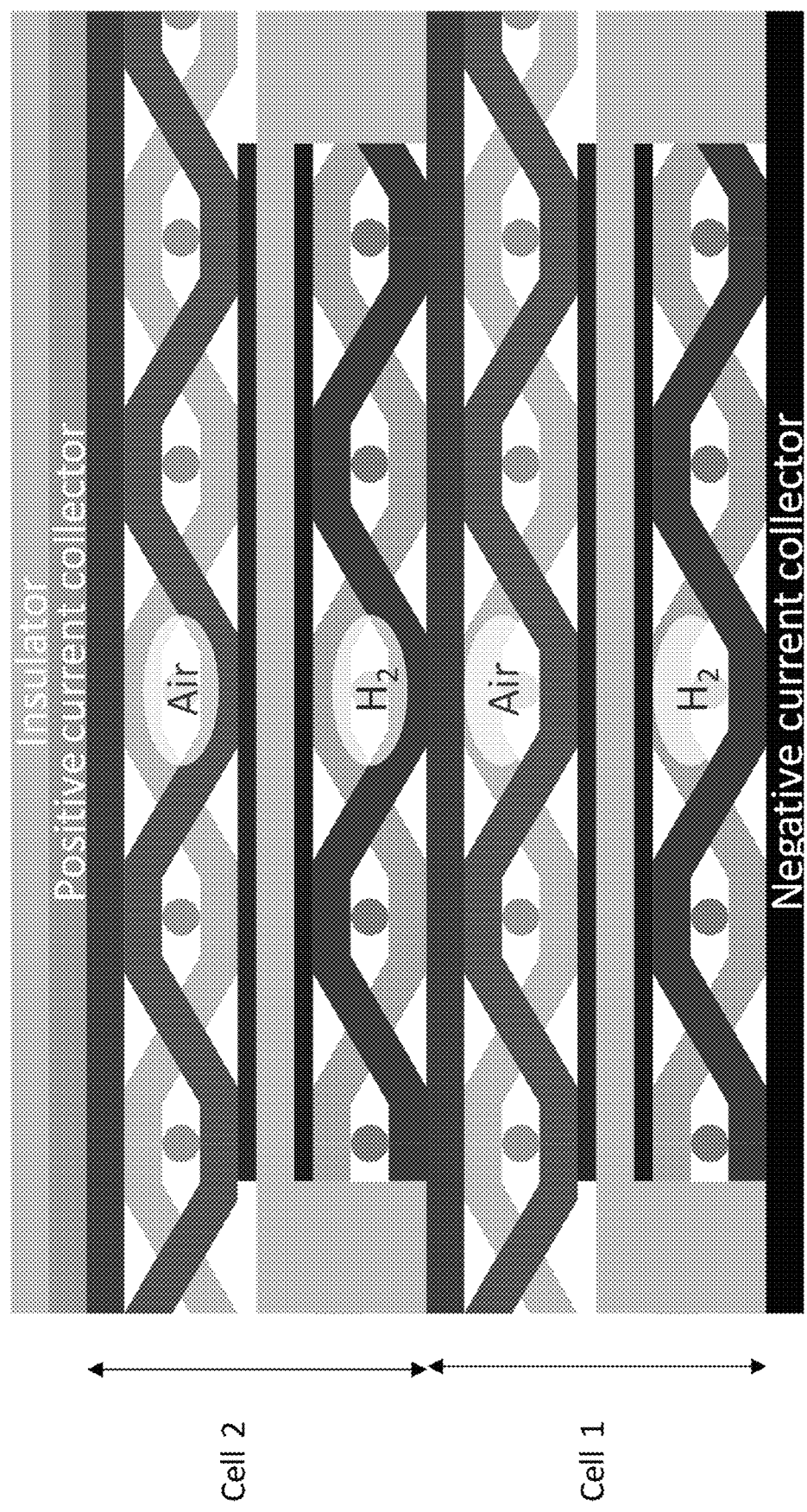
FIG. 6 is also a schematic of a spiral wound module showing an example of a possible configuration including the stacking of two cells and current collectors for the stack.

A spiral wound module is represented in FIG. 5 with particular cell stacking detail. An additional configuration for cell stacking is represented in FIG. 6 that details the stacking of two cells and includes current collectors for the stack.

Figure 7:
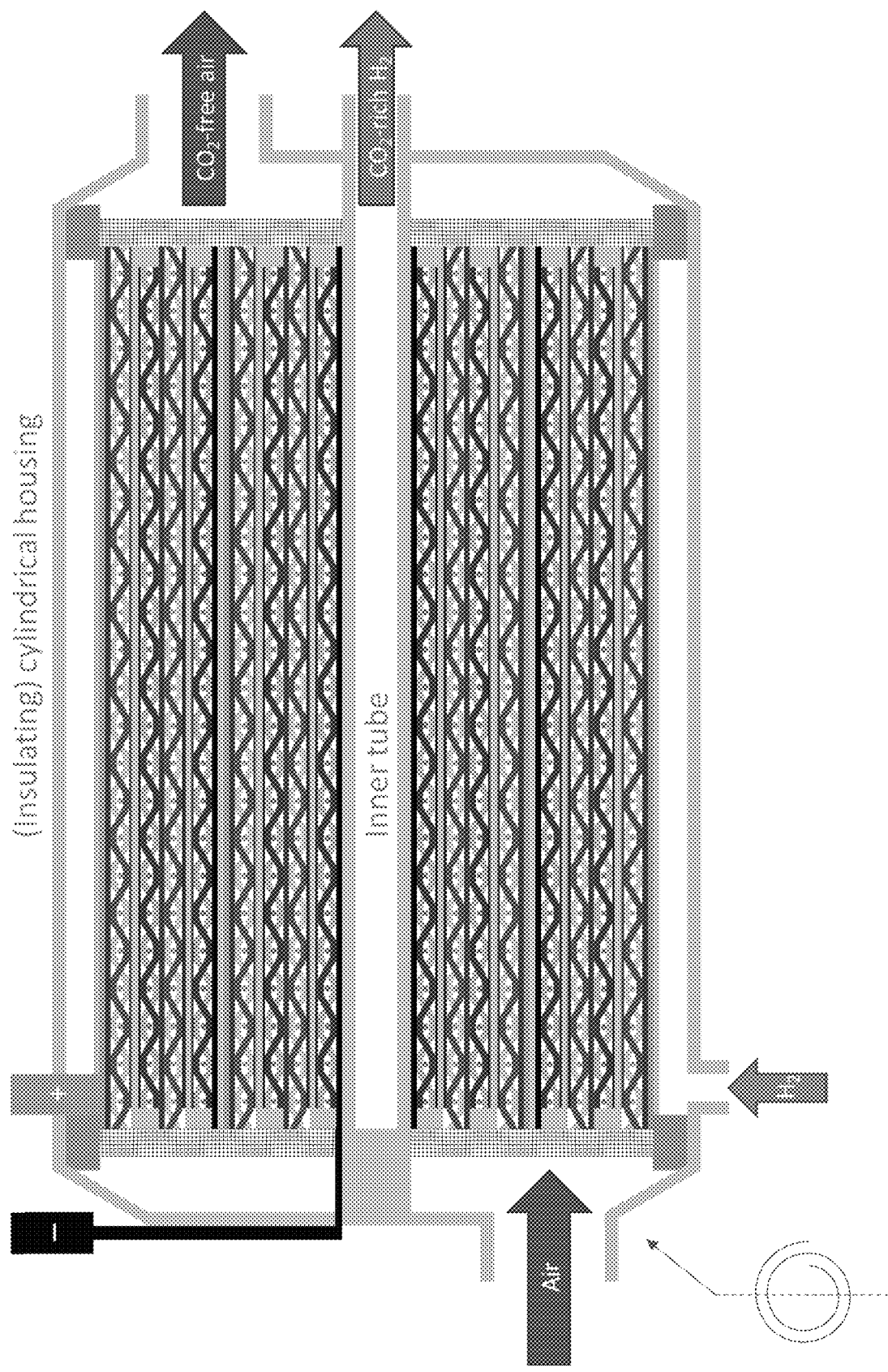
FIG. 7 is a schematic of a spiral-wound module having an external current path and the module axial cross section is shown.

FIG. 7 represents an example of a spiral-wound module having an external current path and the module axial cross section is shown. A person of ordinary skill in the art would have known that fewer or more cells could be stacked in series before winding up the module.

Also, the inner tube could be divided to serve as both the hydrogen inlet and the outlet for the carbon dioxide-rich hydrogen. For example, the HEMFC and ECP fuel cell system or the ECP described herein can have the cell comprises an anode gas flow layer and the anode gas flow layer is in fluid connection with a first manifold and a second manifold in the inner tube. Further, the anode gas flow layer can comprise a flow-directing element that causes gas to flow from the first manifold in the inner tube, outward through one portion of the anode gas flow layer, and then inward through a second portion of the anode gas flow layer to the second manifold in the inner tube. This configuration for is shown in detail in FIG. 8.

The spiral wound module configuration comprises a stack of several cells that are rolled into a spiral-wound cylindrical module format. Each cell comprises a MEA sandwiched between anode and cathode feed spacers, a bipolar plate made of metal foil, and gaskets that seal the edges of the cell, providing an axial flow pathway on the cathode side and a radial flow pathway on the anode side. There are two configurations for the anode inlet and outlet. The spiral-wound module is made by wrapping the cell stack around an inner tube and is inserted into a cylindrical housing. The anode inlet and outlet ports can be at the inner and outer radial ends of the spiral, in either order. Alternatively, the anode inlet and outlet ports can both be the inner tube, with a bulkhead in the center that separates the two ports. Then, flow-directing elements can be added to the anode feed spacer to direct gas in a U-pattern out to the end of the leaf and back inward. The simplest flow-directing element would be a sealant bead or gasket applied in a line from the bulkhead out to nearly the end of the leaf, which the gas must flow around. However, there could be some stagnant zones near the outer corners of the leaf, so it might be better to use multiple gaskets or sealant beads to make nesting U-shaped flow channels.

Figure 8:
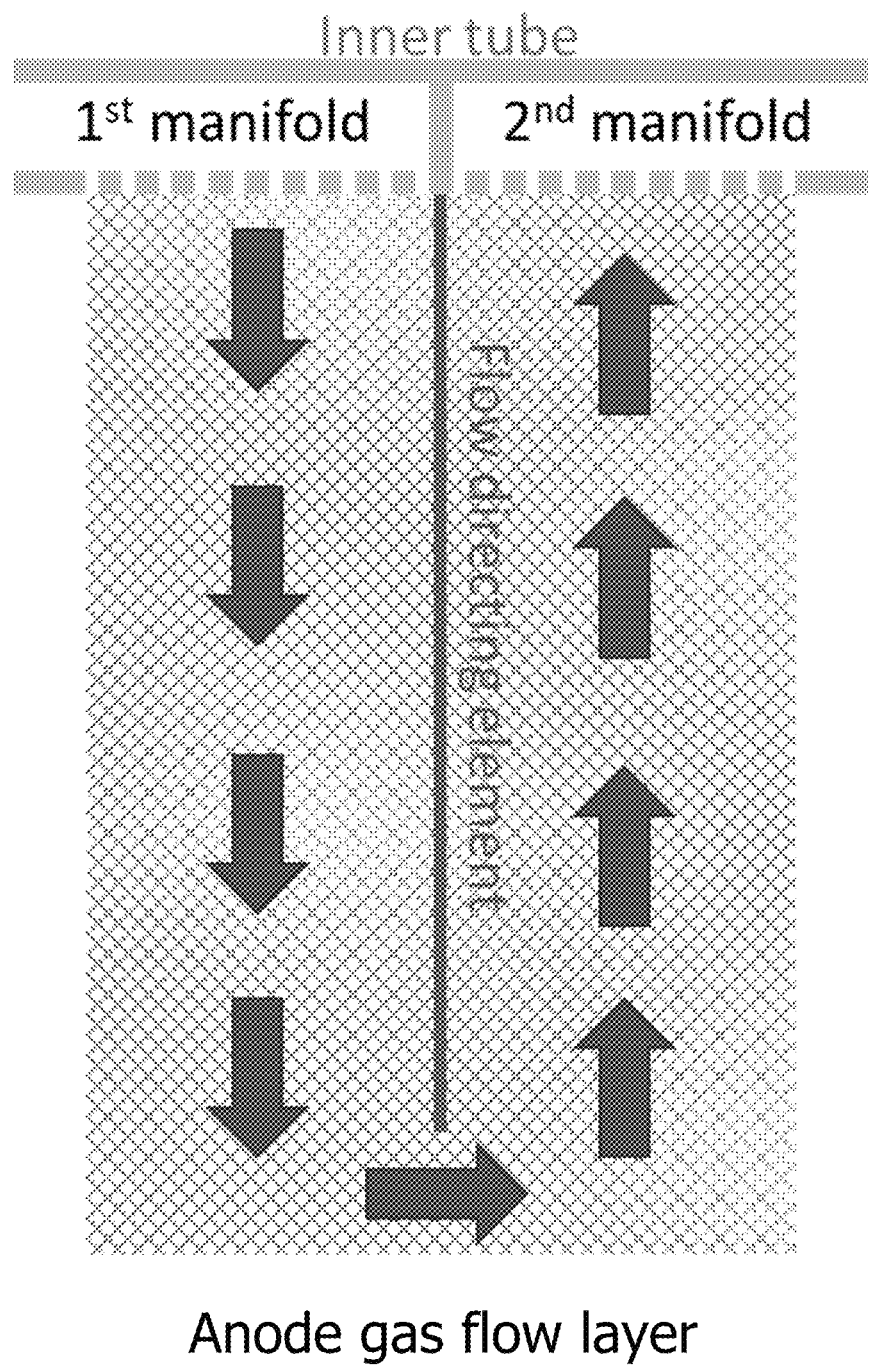
FIG. 8 is a schematic of a possible hydrogen inlet for the modules described herein.
Figure 9:
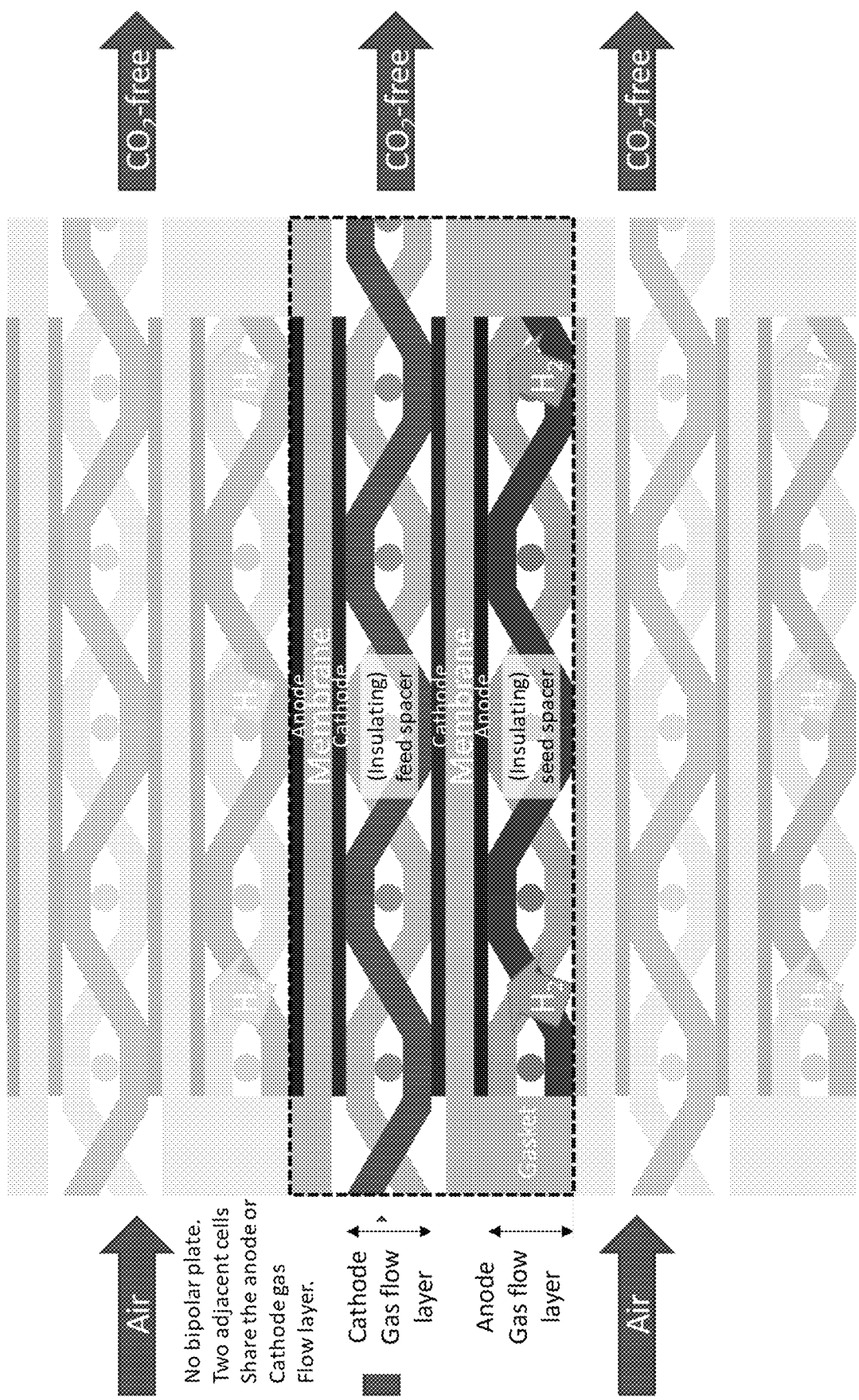
FIG. 9 is a schematic of an iECP and the cell stacking of the module is detailed.

For the iECP, the spiral wound module can have cell stacking represented in FIG. 9 and a spiral wound module as represented in FIG. 10. The spiral wound module could also have the hydrogen inlet as represented in FIG. 8.

The HEMFC and ECP fuel cell system or the ECP described herein can have the cell pitch of the ECP is less than about 2 mm, less than about 1.5 mm, or less than about 1 mm.

The iECP described herein can have air as the carbon dioxide-containing gas.

The ECP as well as the ECP in the fuel cell system described herein can have the membrane area/air flow rate ratio be less than or equal to 50 cm$^2$ standard liter per minute (SLPM) at 1 atmosphere.

The ECP as well as the ECP in the fuel cell system described herein can have the cell volume/air flow rate ratio be less than or equal to 10 cm$^3$/SLPM.

Also disclosed is a method for separating carbon dioxide from air or another carbon dioxide-containing gas that comprises supplying the cathode of the ECP described herein or to the ECP in the HEMFC fuel cell system with the carbon dioxide-containing gas and supplying the anode of the ECP with a hydrogen-containing gas.

The method can further comprise passing a current, $I_{cell}$, proportional to $N_{CO2}$, the number of moles of $CO_2$ entering the cathode inlet per second per cell, with $I_{cell}$ defined by:

$$I_{cell} = nF\, N_{CO2}$$

where n is a number in the range 2-50 and F is the Faraday constant. Operating the ECP within this range of n, can achieve practically complete removal of $CO_2$ from the air stream while minimizing use of hydrogen. For the methods described herein, the carbon dioxide-containing gas can be air.

Further, for the methods described herein, the carbon dioxide-containing gas can be a flue gas.

Additionally, the carbon dioxide in the ECP anode outlet stream can be collected. When the carbon dioxide is collected as a mixture with hydrogen, the hydrogen:carbon dioxide ratio can be between about 1:1 and about 4:1.

The hydrogen and carbon dioxide mixture (e.g., synthesis gas) can be fed to a downstream reactor, where the desired ratio depends on the downstream product. For example, the hydrogen:carbon dioxide ratio can be about 4:1 for the Sabatier process (methane), about 3:1 for methanol, about 2:1 for the Fischer-Tropsch process, or about 2:1 for the Bosch reaction (for oxygen recycling on spacecraft (e.g., $CO_2 + 2\,H_2 = C + 2H_2O$).

Further disclosed is an ECP for separating carbon dioxide from a carbon dioxide-containing gas comprising a cell, the cell comprising a membrane and two electrodes that are each capable of acting as an anode or a cathode; the two electrodes each independently comprising a charge-storage compound that reacts to form hydroxide when serving as cathode and reacts to consume hydroxide or produce protons when serving as anode; the membrane being adjacent to and separating the two electrodes; wherein a carbon dioxide-containing gas is contacted with the electrode serving as cathode and the carbon dioxide reacts with the hydroxide ions to form bicarbonate ions, carbonate ions, or bicarbonate and carbonate ions; the bicarbonate ions, carbonate ions, or bicarbonate and carbonate ions are transported to the electrode serving as anode through the membrane; and the bicarbonate ions, carbonate ions, or bicarbonate and carbonate ions react at the electrode serving as anode to form carbon dioxide and water; wherein the ECP also comprises means for reversing the direction of current flow and simultaneously alternating the electrode with which the carbon dioxide-containing gas is contacted, thereby allowing each electrode to serve, in turn, as anode and as cathode.

The ECP described above can have one or both electrodes comprise a metal oxide, a metal hydroxide, a metal oxyhydroxide, or a hydrogen storage alloy. The metal oxyhydroxide can comprise nickel oxyhydroxide. The metal oxide can comprise manganese dioxide. The hydrogen storage alloy can comprise a lanthanum nickel hydride.

Also disclosed in a method for separating carbon dioxide from a carbon dioxide-containing gas comprising supplying the cathode of the electrochemical pump (ECP) as described having one or both electrodes comprising a metal oxide, a metal hydroxide, a metal oxyhydroxide, or a hydrogen storage alloy with the carbon dioxide-containing gas.

Preferably, for this method described immediately above, the carbon dioxide-containing gas is a flue gas.

The current in the ECP is supplied by a power supply, and the power supply can directly reverse its output current or a dual pole dual throw switch/relay can be used to reverse the connections between the terminals of the ECP and the terminals of the power supply.

For gas flows, four way valves at inlet and outlet are required. For example, the gas flows can be arranged so that in Mode A, Electrode 1 has the $CO_2$-containing gas flowing in, and the $CO_2$-depleted gas flowing out and Electrode 2 has the sweep gas flowing in (optional), and the $CO_2$-enriched gas flowing out. In Mode B, Electrode 1 has the sweep gas flowing in (optional), and the $CO_2$-enriched gas flowing out and Electrode 2 has the $CO_2$-containing gas flowing in, and the $CO_2$-depleted gas flowing out.

Further disclosed is a battery system comprising a metal-air battery and an electrochemical pump (ECP) for separating carbon dioxide from a carbon dioxide-containing gas, the ECP comprising a cell, the cell comprising an anode, a cathode, and a membrane. The anode comprises an anode electrocatalyst for oxidizing a reagent to form protons or consume hydroxide ions. The cathode comprises a cathode electrocatalyst for reducing oxygen to form hydroxide ions. The membrane is adjacent to and separating the anode and the cathode. The carbon dioxide-containing gas is supplied to the cathode and the carbon dioxide reacts with the hydroxide ions formed at the cathode to form bicarbonate ions, carbonate ions, or bicarbonate and carbonate ions. The bicarbonate ions, carbonate ions, or bicarbonate and carbonate ions are transported to the anode through the membrane; and the bicarbonate ions, carbonate ions, or bicarbonate and carbonate ions react at the anode to form carbon dioxide and water. The carbon dioxide-containing gas is air and after the air passes through the cathode of the ECP to reduce the concentration of the carbon dioxide, the air having the reduced concentration of carbon dioxide is directed to a cathode inlet of the metal-air battery.

When considering the following equation:

$$I_{cell} = nF\ N_{CO_2},$$

It is desirable to operate at low values of n to lower energy consumption, but the rate of capture of carbon dioxide declines at low values of n. The reason this occurs is because the hydroxide:carbonate ratio in the cathode is decreasing (i.e., decreasing hydroxide generation). Hydroxide is the active agent for $CO_2$ capture, so a lower hydroxide concentration will reduce the rate of capture. As the hydroxide concentration decreases, the kinetics of $CO_2$ capture decrease before the equilibrium partial pressure of $CO_2$ becomes significant, which means that the same high fraction of CO2 capture is possible, but the required ECP area is larger. With an appropriate catalyst, the $CO_2$ capture rate can be maintained at low values of n (e.g. n=2-10), reducing energy (e.g., hydrogen) consumption without requiring a larger ECP.

Primary, secondary, and tertiary amines are active for $CO_2$ capture. With tertiary amines, $CO_2$ and water react to form a tertiary ammonium bicarbonate ($R_3NH^+HCO_3^-$). If the tertiary amine is incorporated into the ionomer (physically or chemically), the bicarbonate can be handed off to the ionomer, and the ammonium can be rapidly neutralized by hydroxide so that it is active for $CO_2$ capture again. The key advantage is that the concentration of tertiary amine can be very high, even if substantial carbonate buildup has occurred, and only a small amount of hydroxide is present.

Primary and secondary amines can form bicarbonate salts, but ammonium carbamates —$R_2HNH^+\ R_2HNCOO^-$ are predominantly formed.

As to the construction, one method is to incorporate branched polyethyleneimine into the cathode structure together with the ionomer. A second method is to use an ionomer with a combination of quaternary ammonium and primary-tertiary amines.

Similar to the rationale for the $CO_2$ hydration catalyst, it is desirable to improve performance at low values of n (low current density). The $CO_2$ capture rate decreases when carbonate builds up at the cathode and lowers the hydroxide concentration. For high enough values of membrane resistance, the ratio of carbonate to hydroxide in the cathode will be determined by the ratio of their rates of generation and their electrochemical mobility in the ionomer. At this limit, anion transport through the ionomer is dominated by migration.

However, for lower values of membrane resistance, the potential gradient is smaller, and diffusion plays a role. The concentration of carbonate and bicarbonate are very high near the anode and diffusion will push hydroxide towards the anode and push carbonate back towards the cathode, causing more carbonate buildup, and reducing the $CO_2$ capture rate.

If the membrane resistance is too high, there will not be a sufficient electromotive force to drive the current. Ideally, the Ohmic (iR) loss is maintained between 10 mV and 300 mV. If the design current were 5-30 mA/cm², the membrane resistance can be a minimum of 2 Ohm-cm² and a maximum of 10 Ohm-cm². More broadly, a membrane resistance of between 0.5 and 20 Ohm-cm² could be considered.

For the iECP described herein, there is not a way to directly control the cell current density. One way to possibly control the hydrogen consumption is by intentionally limiting the supply of hydrogen to the cell to produce a low average cell current through fuel starvation, although fuel starvation will provide a non-uniform current density distribution and poor $CO_2$ capture performance. Even if the cell resistances are properly tuned to give an optimal current density at one flow rate of air, the HEMFC fuel cell system application requires that the flow rate to the iECP is increased and decreased as the flow rate to the HEMFC is increased or decreased. If the flow rates are not increased and decreased accordingly, too much hydrogen is consumed at a partial load.

Since the anode and cathode flow rates are the only parameters to be controlled in the iECP, and the cathode flow rate matches the HEMFC load, the anode gas supply could be the target for controlling internal current density.

To control the rate of hydrogen supply from the anode gas flow layer to the anode, a diffusion barrier can be added to the anode that then operates at a diffusion-limiting current density determined by the barrier. Normally at the iECP operating current density, mass transport is rapid and there is essentially no hydrogen concentration gradient between the anode gas flow layer and the anode electrocatalyst surface. Such a negligible hydrogen concentration gradient would not result is a significant voltage loss and would not influence cell current density.

A way to control the cell current density for an iECP would be to put a micro porous or partially gas-permeable barrier between the anode and the anode gas flow layer. Advantageously, such barrier would block hydrogen transport, except for the small amount that could diffuse through the barrier (e.g., on the order of 10 mA/cm²). As the cell approaches this current density, the anode would run out of hydrogen and the cell voltage would decrease to zero. The flux of hydrogen through the ionomer film and the limiting current density, are described by:

$$N_{H2} = \frac{i_{lim}}{2F} = \frac{D}{RT}\frac{p_{H2}}{L_{film}},$$

where $N_{H2}$ is flux of hydrogen, i is limiting current density, D is diffusivity of hydrogen in the barrier, R is the gas constant, T is temperature, $p_{H2}$ is the partial pressure of hydrogen, and $L_{film}$ is the thickness of the barrier. If we can control $p_{H2}$, then we can control $i_{lim}$. The partial pressure of hydrogen can be controlled by changing the total pressure, by recycling the $CO_2$-rich, hydrogen-depleted outlet gas, or by mixing in some air or HEMFC-exhaust air (e.g., less oxygen). The latter strategy would consume some hydrogen via catalytic combustion, but would dilute the remaining hydrogen with nitrogen.

The diffusion barrier will cause $CO_2$ to build up to a higher concentration in the anode. Here, it could be advantageous to use a diffusion barrier with selectivity for carbon dioxide over hydrogen permeation, such as an ionomer film. Increasing carbon dioxide permeation relative to hydrogen will minimize the carbon dioxide gradient from the anode to the anode gas flow layer. However, the sensitivity of hydrogen and carbon dioxide permeation rates to temperature and relative humidity must be considered as well. It would be preferable to minimize this sensitivity to achieve more predictable control of cell current density from hydrogen partial pressure.

The basic control method for the HEMFC and ECP described herein is to adjust the current density and hydrogen flow rates to be proportional to the air flow rate demanded by the HEMFC. It may be advantageous to reduce current and hydrogen supply more than 1:1 with reducing air demand, because the required ECP performance is lower as well, so additional carbonate buildup is acceptable. This would reduce the parasitic hydrogen consumption when the HEMFC is at partial load.

For the iECP cell, the hydrogen recycle and hydrogen dilution strategies are expected to only work with the hydrogen diffusion barrier. The pulsed hydrogen flow is an alternative method that could work without a hydrogen diffusion barrier and has the advantage that most PEMFC system implementations use a pulsed purge, rather than a continuous purge. The advantages of this method probably apply to HEMFC systems as well.

If the cell is continuously starved of hydrogen, the result is a high current density near the anode inlet and a very low current near the anode outlet, where hydrogen is depleted. If instead, hydrogen is pulsed at a high flow, the entire anode gas flow layer can be filled with a high concentration of hydrogen. At these conditions, the cell will go to its maximum design current density (e.g. 30 mA/cm$^2$). Then, when the hydrogen supply is cut off, the hydrogen will be consumed uniformly across the entire cell from the anode gas flow layer. The current will stay at 30 mA/cm$^2$ until the hydrogen is depleted, and then the cell current will quickly fall to zero. When the current reaches zero, carbonate will build up in the cathode and also start to diffuse over from the anode. The stored hydroxide will continue to capture $CO_2$ until the hydroxide is completely consumed. As long as the next hydrogen pulse comes before the hydroxide concentration is too low, sufficient iECP performance will be maintained. The current pulse will pump the accumulated carbonate to the anode and replace it with hydroxide, and start the cycle over again.

The ECPs described herein can be applied to carbon dioxide removal from a gas stream containing an electrochemically reducible component and carbon dioxide into a gas stream containing an electrochemically oxidizable component. Possible cathode reactions include oxygen reduction, proton reduction (i.e., hydrogen evolution). Possible anode reactions include hydrogen oxidation, water oxidation (i.e., oxygen evolution), and ammonia oxidation.

The ECPs described herein can be used to remove an acid gas that dissolves, reacts, or dissociates in water to form anions and protons, in whole or in part, from an acid gas-containing stream. These acid gases can include sulfur dioxide and hydrogen sulfide.

The ECPs described herein can be used to remove a basic gas that dissolves, reacts, or dissociates in water to form cations and hydroxide, in whole or in part, from a basic gas-containing stream. The basic gases can include ammonia and organic amines. In this case, the anion exchange polymer is replaced with a cation exchange polymer, and the gases to purify must be introduced to the anode. Hydrogen oxidation, ammonia oxidation, and water oxidation (i.e., oxygen evolution) can be included as anode reactions compatible with this cell. Oxygen reduction, proton reduction (i.e., hydrogen evolution) are a nonexhaustive list of cathode reactions compatible with this cell.

Battery electrode reactions can be used in place of fuel cell reactions for the anode and cathode. In these cases, cyclic operation is required, with current flow and gas supply connections reversed periodically to alternate which electrode is the cathode and captures carbon dioxide, and which electrode is the anode and concentrates carbon dioxide.

Definitions

As used herein, the "cell pitch" is the shortest distance from the anode-membrane interface of one cell to the anode-membrane interface of the neighboring cell. Alternatively, it is the combined thickness of anode, membrane, cathode, anode gas flow layer, cathode gas flow layer, and bipolar plate.

The "bipolar plate" is the part that separates adjacent cells in a series-connected stack of cells and provides an electrical connection between the cathode of one cell and the anode of an adjacent cell, while keeping the gas flow layers separate.

The "gas flow layer" is the layer of the cell through which gas flows and from which gas may be exchanged with either the anode or the cathode ("anode gas flow layer" and "cathode gas flow layer", respectively).

The "$CO_2$ mass transport resistance" is a performance metric of the ECP defined as the average $CO_2$ concentration in the cathode gas transport layer divided by the $CO_2$ removal rate per unit MEA area. Mathematically, the $CO_2$ mass transport resistance ($R_{MT}$) is calculated as $$R_{MT} = \frac{A}{v(\ln(x_{in}) - \ln(x_{out}))},$$

where A is the total MEA area in the ECP (units of m$^2$), v is the volumetric flow rate of $CO_2$-containing gas to the ECP (m$^3$/s), and $x_{in}$ and $x_{out}$ are the $CO_2$ mole fractions in the $CO_2$-containing gas at the inlet and outlet of the ECP, respectively (unitless).

Having described the invention in detail, it will be apparent that modifications and variations are possible without departing from the scope of the invention defined in the appended claims.

EXAMPLES

The following non-limiting examples are provided to further illustrate the present invention.

Example 1: Modeling of the ECP for Removing $CO_2$

The mechanism for the ECP of carbon dioxide can be understood through a one dimensional membrane-electrode assembly (MEA) model incorporating electrochemical transport and reactions. The conversion between carbon dioxide, bicarbonate, and carbonate is handled by assuming the water in the ionomer behaves as a dilute aqueous electrolyte, using literature tabulated rate constants and activation energy. The key reactions are $$CO_2 + H_2O \rightleftharpoons H_2CO_3, \qquad [11]$$

$$CO_2 + OH^- \rightleftharpoons HCO_3^-, \qquad [12]$$

Where in reaction [12] is dominant in the cathode and reaction [11] is dominant in the anode. Carbonic acid, bicarbonate, and carbonate can interconvert according to two acid-base equilibria, $$H_2CO_3 + OH^- \rightleftharpoons HCO_3^- + H_2O, \qquad [13]$$

$$HCO_3^- + OH^- \rightleftharpoons CO_3^{2-} + H_2O, \qquad [14]$$

Figure 13:
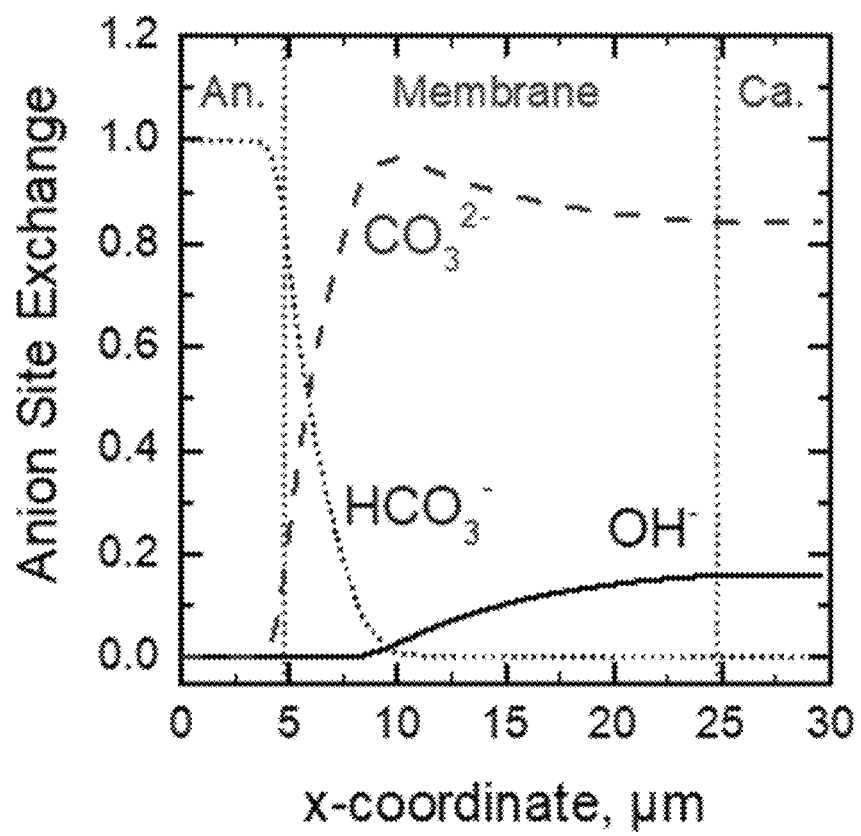
FIG. 13 is a graph of the modeled concentration profiles of anions in the membrane electrode assembly (MEA) at 20 mA/cm². The cell temperature is 70° C. and the gases supplied to anode gas flow layer and cathode gas flow layer are hydrogen with 100,000 ppm $CO_2$ and air with 400 ppm $CO_2$ respectively, both at 2 bar.

The net rate of $CO_2$ hydration is given by:

$$r_{CO2} = \epsilon_{ion} \phi_{H2O} \left[ \left( k_1 + \frac{k_2 c_H}{\phi_{H2O}} \right) K_{H,CO2} p_{CO2} - \left( \frac{k_{-1} K_{b2} \phi_{H2O}}{c_H} + k_{-2} \right) \frac{c_B}{\phi_{H2O}} \right], \qquad [15]$$

where $k_1$, $k_{-1}$, $k_2$, $k_{-2}$ are the forward and backwards rate constants for the neutral (eq. 11) and alkaline (eq. 12) $CO_2$ hydration mechanisms, respectively, $\epsilon_{ion}$ is the volume fraction of ionomer in the electrode, $\phi_{H2O}$ is the volume fraction of water in the ionomer, $K_{H,CO2}$ is the Henry's law constant of $CO_2$ in water, $p_{CO2}$ is the partial pressure of $CO_2$ in the gas pore, $c_i$ is concentration of ion i, and $K_{b2}$ is the acid-base equilibrium constant between carbonic acid and bicarbonate (eq. 13). The three key ions are designated by subscripts H for hydroxide, C for carbonate, and B for bicarbonate. Electrochemical transport is modeled using the Nernst-Planck equation, $$N_i = -D_i\left(\frac{dc_i}{dx}\right) - \frac{z_i F D_i}{RT} c_i \left(\frac{d\Phi_2}{dx}\right), \quad [16]$$

where $N_i$ is flux, $D_i$ is diffusivity, $z_i$ is charge, all of ion i. $\phi_2$ is the ionic potential, x is the spatial coordinate. The simulated concentration profiles of hydroxide, carbonate, and bicarbonate are shown in FIG. 13 for an MEA with a 20 μm low-conductivity membrane (4 Ω·cm²), 0.01 mgPt/cm² anode (5 wt % Pt/C), and 1 mg/cm² Ag cathode. The one dimensional model was run with fixed flow channel composition as a boundary condition—in this case 400 ppm at cathode and 10,000 ppm at anode. The electric field generated at low current densities is sufficient to maintain a pH gradient of about 6 units, which creates a very large difference in the anode and cathode equilibrium $CO_2$ concentration, driving nearly irreversible $CO_2$ pumping.

Figure 14A:
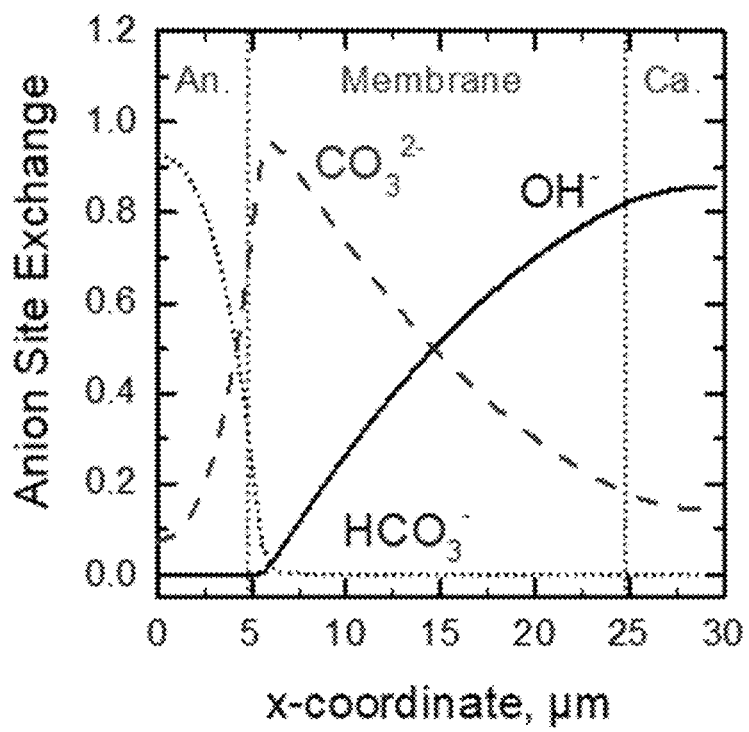
FIG. 14A is a graph of the modeled anion concentration profiles (at 20 mA/cm²) through the thickness of the MEA at a location corresponding to the cathode outlet at 99.9% $CO_2$ removal. The cell temperature is 70° C. and the gases supplied to anode gas flow layer and cathode gas flow layer are hydrogen with 100,000 ppm $CO_2$ and air with 0.4 ppm $CO_2$ respectively, both at 2 bar.
Figure 14B:
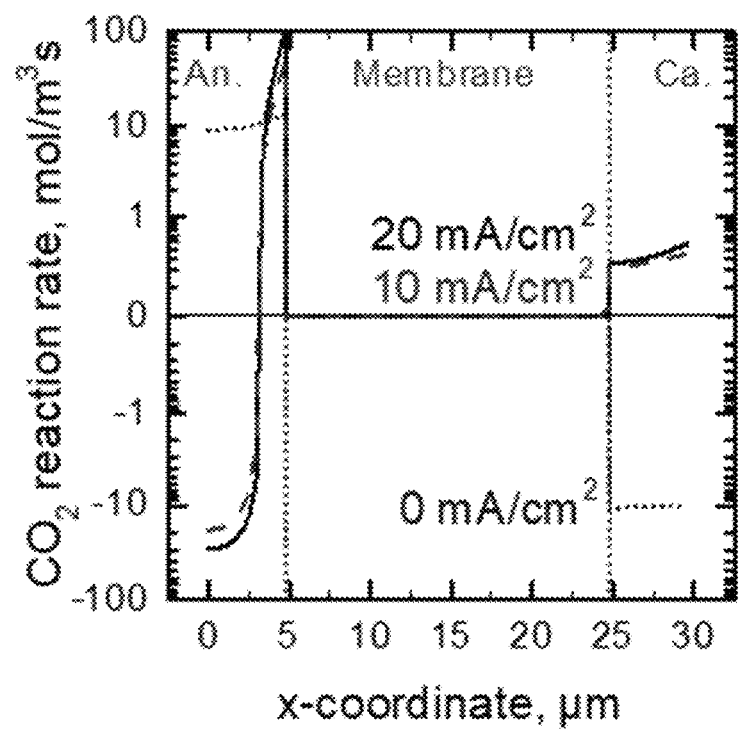
FIG. 14B is a graph of the modeled $CO_2$ reaction rate profile. Positive rates signify $CO_2$ capture and negative rates signify $CO_2$ release. The cell temperature is 70° C. and the gases supplied to anode gas flow layer and cathode gas flow layer are hydrogen with 100,000 ppm $CO_2$ and air with 0.4 ppm $CO_2$ respectively, both at 2 bar.

The ability of the $CO_2$ ECP to achieve >99.9% removal of $CO_2$ from air is illustrated in FIG. 14, which shows simulation results for a cathode flow channel concentration of 0.4 ppm and an anode flow channel concentration of 100,000 ppm. FIG. 14A shows anion concentration profiles, and FIG. 14B shows the $CO_2$ hydration/dehydration rate (e.g. capture/release respectively) at open circuit, 10, and 20 mA/cm². At open circuit, $CO_2$ is transported according to the concentration gradient, but at 10-20 mA/cm², $CO_2$ is captured from the cathode.

Calculations estimate the characteristic length scale for $CO_2$ reaction/diffusion into hydroxide form ionomer is only 50 nm at 70° C. Given this length scale, any $CO_2$ diffusing through the membrane from the anode towards cathode will react with hydroxide long before reaching the cathode.

Example 2: eECP Operating in Air/Hydrogen Mode

Proof-of-concept for the ECP was demonstrated experimentally using a single Air/Hydrogen cell, to probe the effects of operating temperature and current density on ECP performance in removing $CO_2$ from the air stream to the hydrogen stream. Cathode or anode outlet gases were monitored by a $CO_2$ sensor (Vaisala GMP252). The first experiment used 0.4 mgPt/cm² as 47 wt % Pt/C in both electrodes of a 5 cm² cell (#1) and demonstrated $CO_2$ levels in the air exhaust below 100 ppm at low current densities (≤40 mA/cm²). Given this initial success and the tight cost requirements for the ultimate application, a 25 cm² cell (#2) was prepared with low-cost electrodes: 0.013 $mg_{Pt}/cm^2$ as 5 wt. % Pt/C in the anode and 0.6 mg/cm² of unsupported Ag in the cathode. The second cell was investigated over a wider range of flow rates, demonstrating $CO_2$ removal to low ppm levels (determination limited by the accuracy of the $CO_2$ sensor). To demonstrate the room for performance improvement, cell #3 was fabricated using the same gas diffusion electrodes as cell #2, but with a porous carbon-ionomer interlayer applied directly to the cathode side of the membrane. Such interlayer provides more accessible ionomer volume for $CO_2$ reaction with hydroxide. All experiments used PAP membranes and ionomers. The PAP membranes and ionomers are described in U.S. application Ser. No. 16/146,887, herein incorporated by reference.

When the cathode hydroxide concentration is sufficiently high, $CO_2$ capture by cathode OH⁻ is expected to be a first-order, irreversible process, and the $CO_2$ concentration is expected to decrease exponentially down the length of the cathode flow channel. Under these conditions, there should be a log-linear relationship between the outlet $CO_2$ concentration and the inverse flow rate. Such a relationship means that if we need 1 m² active ECP area to achieve 90% $CO_2$ removal, we can achieve 99% removal with 2 m² and 99.9% removal with 3 m². This favorable characteristic calls for experimental evidence, which has been provided.

Figure 15A:
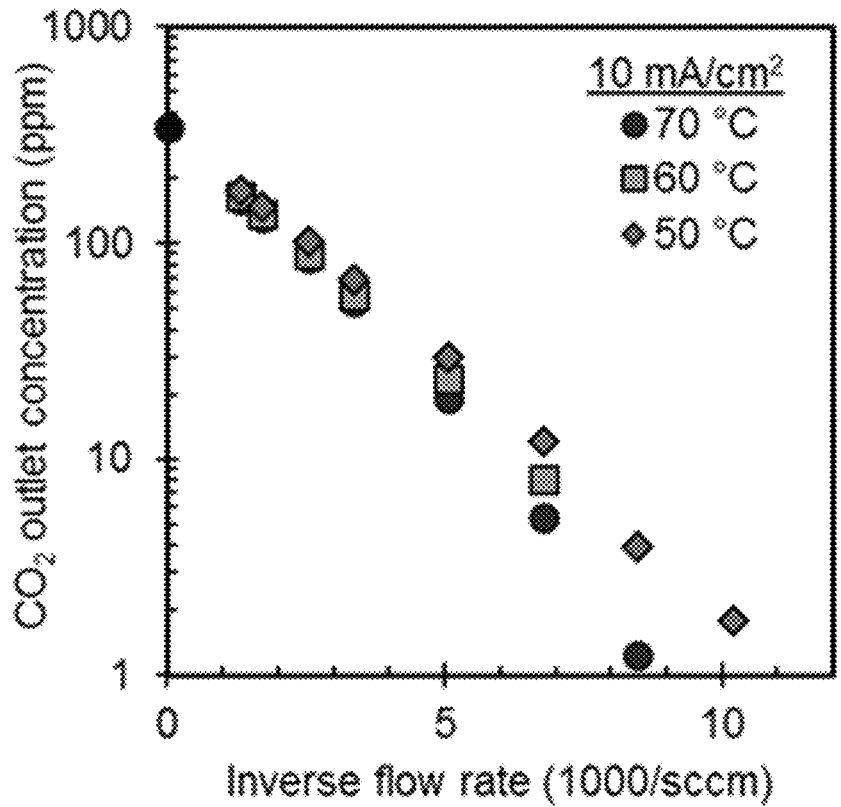
FIGS. 15A and 15B are graphs of the measured cathode outlet $CO_2$ concentration from 25 cm² ECP (cell #2) operating in $H_2$/air mode with a range of air flow rates.
Figure 15B:
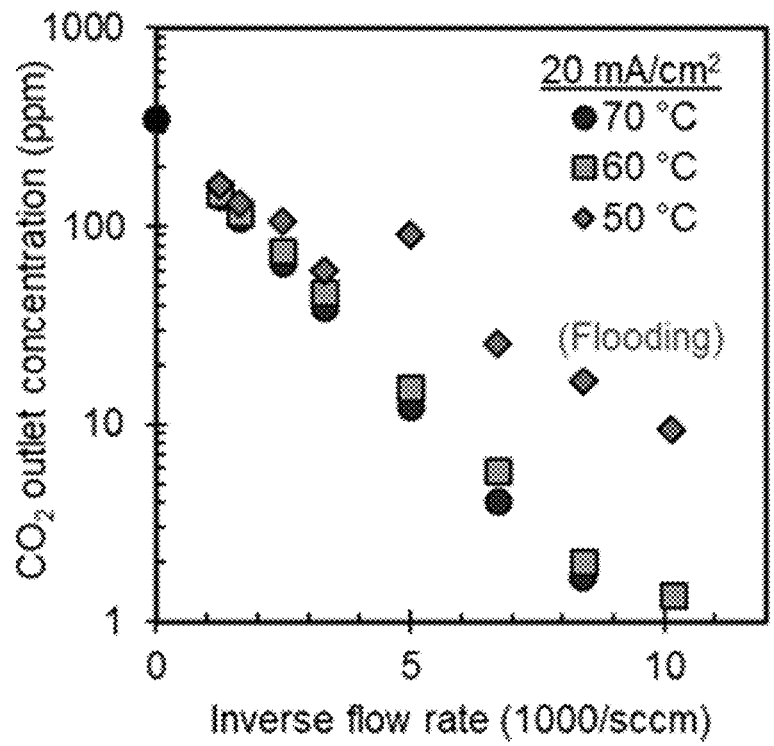

FIG. 15 describes the $CO_2$ removal capacity of a single air/hydrogen cell of 25 cm² with serpentine flow fields (Cell #2), serving as an ECP. The $CO_2$ level in the air exhaust was measured as a function of air flow rate at temperatures between 50° C. and 70° C. The results showed that, at low flow rates, it is possible to achieve $CO_2$ removal down to single-digit ppm $CO_2$. Based on the anode flow rate of 50 sccm, the anode outlet $CO_2$ concentration should range from 700 to 3000 ppm, showing that $CO_2$ could be pumped against an approximately 3 orders of magnitude concentration gradient with no loss of performance. Except in cases where flooding was suspected, the $CO_2$ pump shows first-order irreversible behavior up to 99% $CO_2$ removal, where the limits of sensor accuracy were reached.

Figure 16A:
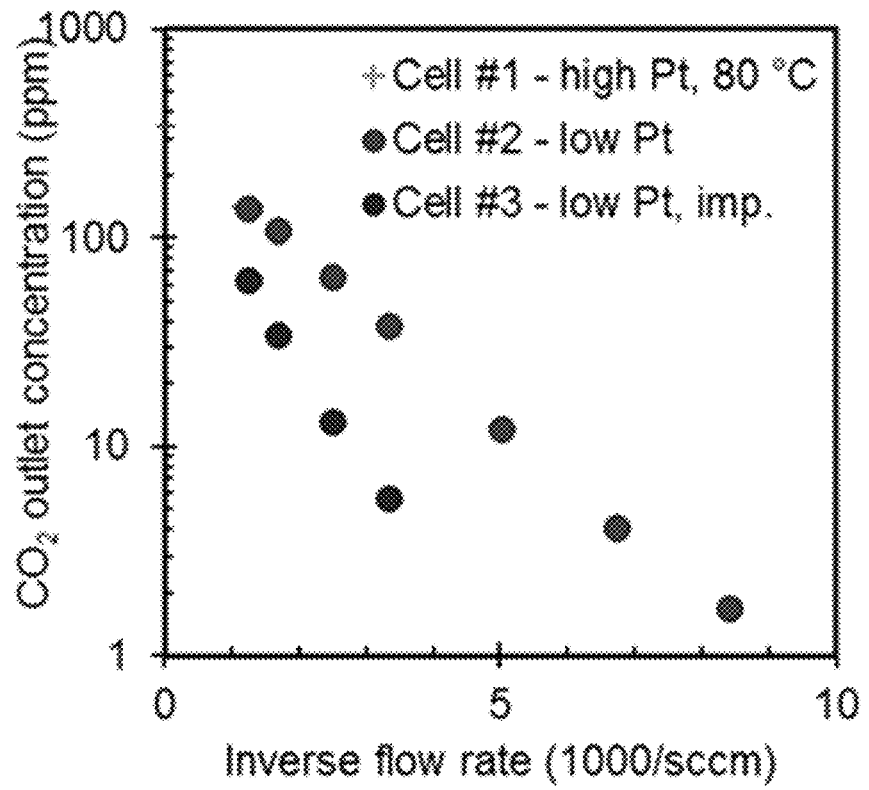
FIGS. 16A and 16B are graphs of a measured $CO_2$ ECP performance at 70° C., 80% RH, 20 mA/cm² for low-loading cell with and without ionomer interlayers and a conventional high-loading cell. The high-loading cell was tested at 80° C., 90% RH, and 5 cm² active area.
Figure 16B:
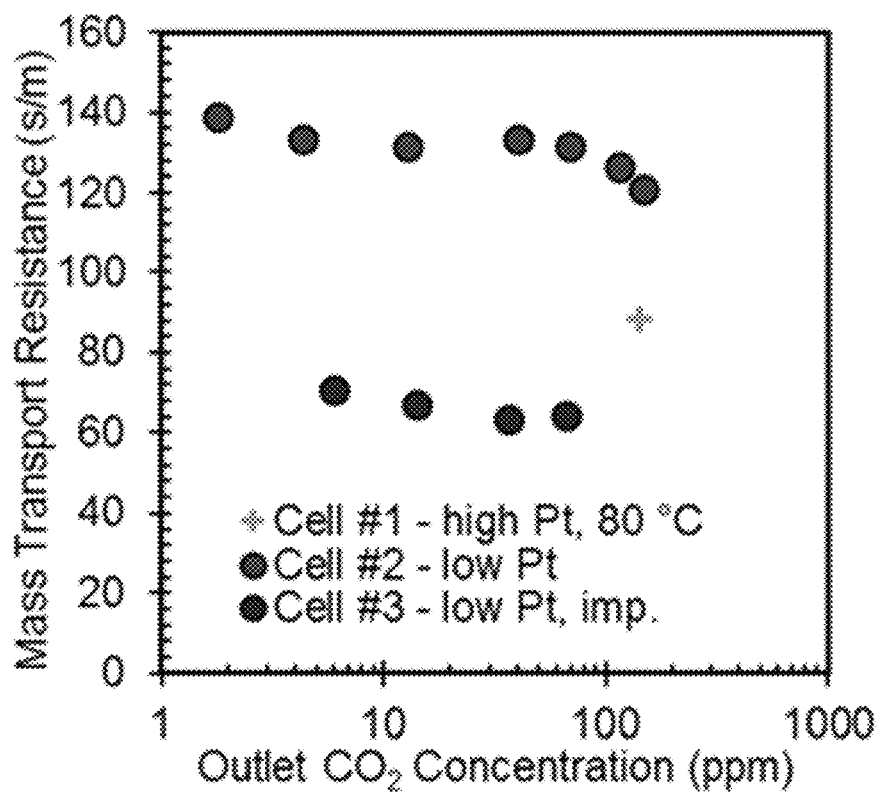

FIG. 16 shows $CO_2$ removal and calculated $CO_2$ mass transport resistance at 70° C. for Cells #2 and #3 and at 80° C. for Cell #1, all at 20 mA/cm². Cell #2 had lower performance than Cell #1, which is likely due to lower ionomer loadings in the cathode, which limited the reaction with hydroxide. Cell #3 showed the best performance, with half the mass transport resistance compared to Cell #2. Cell #3 used a multilayer cathode structure that incorporated more ionomer volume for $CO_2$ capture without using a thick electrocatalyst layer. A thinner electrocatalyst layer would be particularly advantageous if the electrocatalyst is expensive. The mass transport specific resistance is nearly constant with $CO_2$ concentration (FIG. 16b), indicating an ideal first-order process. Under these conditions, moving from 90 to 99.9% $CO_2$ removal requires only tripling of membrane area, making it possible to achieve the air purity specification for the HEMFC stack.

Example 3: iECP Operating in Air/Hydrogen Mode

Figure 17:
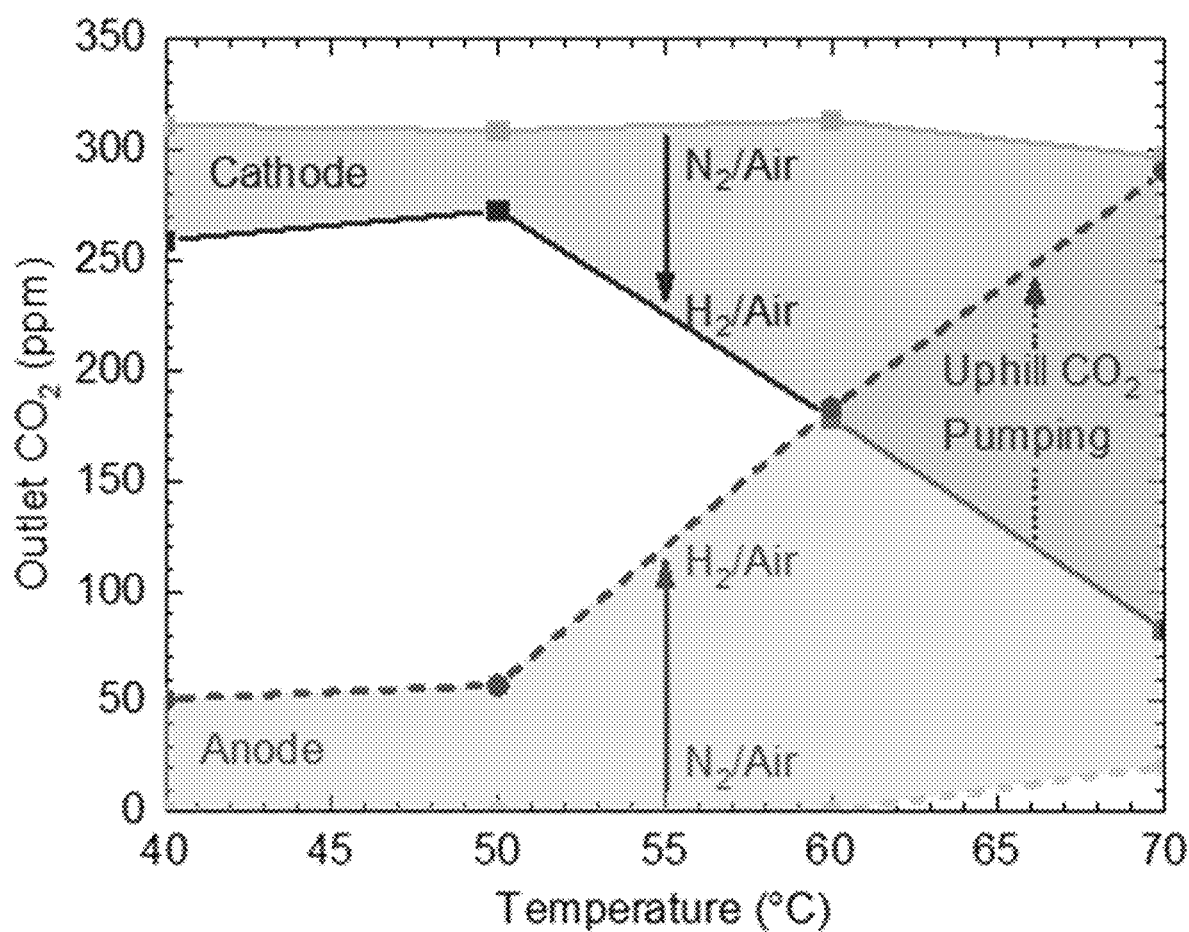
FIG. 17 is a graph of the measured performance of an iECP operating with hydrogen as the anode reagent and oxygen as the cathode reagent. $CO_2$ concentration measured at the anode and cathode outlets with gas flow at 0.1 L min⁻¹, 90% relative humidity, and ambient pressure. The cathode feed gas was air with 350 ppm $CO_2$. Anode gas was $N_2$ or $H_2$ as indicated (controlling cell output). When $N_2$ was used as the anode gas, no significant current was generated in the cell and very little $CO_2$ transport took place. When $H_2$ was used as the anode gas, the resulting current flow caused electrochemical pumping of $CO_2$, which was capable of "uphill" $CO_2$ pumping. "Uphill" $CO_2$ pumping means that the cathode gas stream from which $CO_2$ was transported had a lower $CO_2$ concentration than the anode gas stream to which $CO_2$ was transported. Such transport cannot be driven by the concentration gradient alone, which points in the wrong direction, and must be the result of electrochemical pumping.

Additionally, the iECP concept aimed to achieve simplest operation of, likely, the least expensive ECP, was demonstrated experimentally. A PAP membrane was cast with 30 wt % carbon nanotubes to create internal electronic short, and was made into a MEA using 0.4 mgPt/cm² in the Pt/C catalyzed electrodes. The 5 cm² cell was assembled and tested in a range of cell temperatures, with hydrogen or nitrogen on the anode side, and 350 ppm $CO_2$-containing air on the cathode side. The results are shown in FIG. 17 and roughly match the performance of a similar non-shorted 5 cm² MEA. Due to the low overall cell area, ultra-low levels of $CO_2$ in the air outlet were not achieved, but similar mass transport coefficients were calculated compared to the cells using non-shorted MEAs.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above devices and methods without departing from the scope of the invention, it is intended that all matter contained in the above description and shown in the accompanying drawings shall be interpreted as illustrative and not in a limiting sense.

What is claimed is:

1. An electrochemical pump (ECP) for separating carbon dioxide from a carbon dioxide-containing gas comprising:
  a cell, the cell comprising:
    two electrodes that are capable of serving as an anode or a cathode, the two electrodes each independently comprising a charge-storage compound and an anion exchange polymer, the charge storage compound being capable of reacting to form hydroxide ions when serving as cathode and reacting to consume hydroxide ions or produce protons when serving as anode; and
    a membrane adjacent to and separating the two electrodes;
  wherein the cell is adapted such that in operation:
  the carbon dioxide-containing gas is contacted with the electrode serving as cathode and the carbon dioxide reacts with the hydroxide ions to form bicarbonate ions, carbonate ions, or bicarbonate and carbonate ions;
  the bicarbonate ions, carbonate ions, or bicarbonate and carbonate ions are transported to the electrode serving as anode through the membrane; and
  the bicarbonate ions, carbonate ions, or bicarbonate and carbonate ions react at the electrode serving as anode to form carbon dioxide and water.

2. The ECP of claim 1, wherein one or both of the two electrodes comprise a metal oxide, a metal hydroxide, a metal oxyhydroxide, or a hydrogen storage alloy as the charge-storage compound.

3. The ECP of claim 2, wherein the metal oxyhydroxide comprises nickel oxyhydroxide.

4. The ECP of claim 2, wherein the metal hydroxide comprises nickel hydroxide.

5. The ECP of claim 2, wherein the metal oxide comprises manganese dioxide.

6. The ECP of claim 2, wherein the hydrogen storage alloy comprises a lanthanum nickel hydride.

7. The ECP of claim 1, wherein the membrane comprises an anion exchange polymer.

8. The ECP of claim 1, further comprising a power supply for supplying a current flow to the electrodes, wherein the power supply is adapted to alternately reverse direction of current flow, thereby allowing each of the electrodes to serve, in turn, as the anode and as the cathode.

9. The ECP of claim 1, wherein the cell further comprises porous ionomer layer between the membrane and each of the two electrodes.

10. The ECP of claim 9, wherein the porous ionomer layer comprises an anion exchange polymer.

11. The ECP of claim 9, wherein the anion exchange polymer of the two electrodes, the anion exchange polymer of the membrane and/or the anion exchange membrane of the ionomer layer independently comprise quaternary ammonium or imidazolium groups and a polymer backbone not having ether groups.

12. The ECP of claim 9, wherein the anion exchange polymer of the two electrodes, the anion exchange polymer of the membrane and/or the anion exchange membrane of the ionomer layer independently comprise poly(arylpiperidinium), alkylammonium-functionalized poly(aryl alkylene), substituted-imidazolium-functionalized poly(aryl alkylene), alkylammonium-functionalized poly(styrene), substituted-imidazolium-functionalized poly(styrene), alkylammonium-functionalized poly(styrene-co-divinylbenzene), substituted-imidazolium-functionalized poly(styrene-co-divinylbenzene), alkylammonium-functionalized poly(styrene-block-ethylene-co-butadiene-block-styrene), substituted-imidazolium-functionalized, poly(styrene-block-ethylene-co-butadiene-block-styrene), alkylammonium-functionalized poly(ethylene), substituted-imidazolium-functionalized poly(ethylene), alkylammonium-functionalized poly(tetrafluoroethylene), substituted-imidazolium-functionalized poly(tetrafluoroethylene), alkylammonium-functionalized poly(ethylene-co-tetrafluoroethylene), substituted-imidazolium-functionalized poly(ethylene-co-tetrafluoroethylene), polyethyleneimine, poly(diallyl ammonium), polydiallyldimethylammonium or a combination thereof.

13. The ECP of claim 9, wherein the anion exchange polymer of the two electrodes, the anion exchange polymer of the membrane and/or the anion exchange membrane of the ionomer layer independently comprise poly(aryl piperidinium) or poly(diallyl ammonium), or polydiallyldimethylammonium.

14. The ECP of claim 1, wherein the carbon dioxide-containing gas is air.

15. A system comprising:
  a metal-air battery; and
  the electrochemical pump (ECP) of claim 1;
  wherein the ECP is adapted such that in operation, the carbon dioxide-containing gas is air and after the air is supplied to the ECP to reduce the concentration of the carbon dioxide, the air having the reduced concentration of carbon dioxide is directed to a cathode inlet of the metal-air battery.

16. A battery system comprising:
  a metal-air battery; and
  an electrochemical pump (ECP) for separating carbon dioxide from a carbon dioxide-containing gas, the ECP comprising:
    a cell, the cell comprising:
      a cathode comprising a cathode electrocatalyst for reducing oxygen to form hydroxide ions;
      an anode comprising an anode electrocatalyst for oxidizing a reagent to form protons or consume the hydroxide ions; and
      a membrane adjacent to and separating the anode and the cathode;
  wherein the ECP is adapted such that in operation with air as the carbon dioxide-containing gas:
  the carbon dioxide-containing gas is supplied to the cathode and the carbon dioxide reacts with the hydroxide ions formed at the cathode to form bicarbonate ions, carbonate ions, or bicarbonate and carbonate ions;
  the bicarbonate ions, carbonate ions, or bicarbonate and carbonate ions are transported to the anode through the membrane;

the bicarbonate ions, carbonate ions, or bicarbonate and carbonate ions react at the anode to form carbon dioxide and water; and after the air passes through the cathode of the ECP to reduce the concentration of the carbon dioxide, the air having the reduced concentration of carbon dioxide is directed to a cathode inlet of the metal-air battery;

wherein at least one of the following:
- (a) the anode and the cathode are electronically connected through the membrane to form an internal current ECP (iECP), and the membrane comprises an anion exchange polymer and an electronically-conductive material or an electronically-conductive anion exchange polymer; or
- (b) a porous structure-ionomer interlayer separates the membrane from the cathode.

17. A method for separating carbon dioxide from a carbon dioxide-containing gas comprising supplying the electrode serving as the cathode of the electrochemical pump (ECP) of claim 1 with the carbon dioxide-containing gas.

18. The method of claim 17, wherein the carbon dioxide-containing gas is a flue gas.

19. The method of claim 17, wherein the carbon dioxide-containing gas is air.

20. The method of claim 17, wherein electrical current is driven through the ECP in a first phase in which one of the two electrodes serves as the anode and the other of the two electrodes serves as the cathode and a second phase in which current is driven so that the one of the two electrodes serves as the cathode and the other of the two electrodes serves as the anode.

\* \* \* \* \*